(12) United States Patent
Saarinen

(10) Patent No.: US 9,471,127 B2
(45) Date of Patent: Oct. 18, 2016

(54) METHOD, DEVICE AND SYSTEM FOR ENERGY MANAGEMENT

(75) Inventor: Jukka Saarinen, Nokia (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 415 days.

(21) Appl. No.: 14/004,374

(22) PCT Filed: Mar. 16, 2011

(86) PCT No.: PCT/FI2011/050226
§ 371 (c)(1),
(2), (4) Date: Feb. 5, 2014

(87) PCT Pub. No.: WO2012/123619
PCT Pub. Date: Sep. 20, 2012

(65) Prior Publication Data
US 2014/0359325 A1    Dec. 4, 2014

(51) Int. Cl.
G06F 1/00      (2006.01)
G06F 1/32      (2006.01)

(52) U.S. Cl.
CPC .......... *G06F 1/3206* (2013.01); *G06F 1/3234* (2013.01)

(58) Field of Classification Search
CPC ... G06F 1/3225; G06F 1/3206; G06F 1/3234
USPC ........... 706/25, 12; 718/1; 700/17; 382/103, 382/181; 709/238, 224; 707/723; 704/7
See application file for complete search history.

(56) References Cited

U.S. PATENT DOCUMENTS 7,333,962 B2 * 2/2008 Zen .................. G06N 7/005 700/17
8,990,200 B1 * 3/2015 Christensen ...... G06F 17/30528 707/723

(Continued)

FOREIGN PATENT DOCUMENTS

| EP | 0711089 | 5/1996 |
| EP | 1662763 | 5/2006 |
| EP | 2395412 | 12/2011 |

OTHER PUBLICATIONS

International Search Report and Written Opinion received for corresponding Patent Cooperation Treaty Application No. PCT/Fi2011/050226, dated Feb. 1, 2012, 6 pages.

(Continued)

*Primary Examiner* — Aurel Prifti
(74) *Attorney, Agent, or Firm* — Ditthavong & Steiner, P.C.

(57) ABSTRACT

The present application relates to carrying out energy management based on context information. In the method, apparatus and system according to the application, a context vector (820) is used to select a operational state plurality of operational state vectors (825, 835). The plurality of operational state vectors are indicative of the state and/or energy consumption of different operational units in the corresponding context. The selected operational state vectors are then used together in adapting an operational state of the operational units according to the needs in the context (855). There is also a method and devices for forming a data structure (810) that can be used in the selection of the operational state vectors. The method can be used in the energy management of mobile devices, where the operational units are components of these devices and the context can include data from sensors. The method may use an associative memory such as a sparse distributed memory in storing operational state vectors.

17 Claims, 10 Drawing Sheets

(56) References Cited

U.S. PATENT DOCUMENTS

| | | | |
|---|---|---|---|
| 2006/0009963 A1* | 1/2006 | Gaussier | G06F 17/2735 704/7 |
| 2007/0061319 A1* | 3/2007 | Bergholz | G06F 17/3071 |
| 2008/0005381 A1 | 1/2008 | Theocharous et al. | |
| 2008/0240566 A1* | 10/2008 | Thint | G06F 17/3071 382/181 |
| 2009/0055523 A1* | 2/2009 | Song | H04L 67/306 709/224 |
| 2009/0319683 A1* | 12/2009 | Martin | H04L 29/12594 709/238 |
| 2010/0304754 A1 | 12/2010 | Czompo et al. | |
| 2010/0312735 A1* | 12/2010 | Knoblauch | G06N 3/08 706/25 |
| 2011/0060708 A1* | 3/2011 | Suzuki | G06N 99/005 706/12 |
| 2011/0064268 A1* | 3/2011 | Cobb | G06K 9/00335 382/103 |
| 2012/0011504 A1* | 1/2012 | Ahmad | G06F 12/08 718/1 |

OTHER PUBLICATIONS

Wang, Y. et al. "A Framework of energy efficient mobile sensing for antomatic user state recognition." Proceedings of the 7th international conference on Mobile systems, applications, and services (Mobisys'09) [online] Jun. 22, 2009, pp. 179-192. Retrieved from the internet: <URL: http:dl.acm.org/citation.cfm?doid=1555816. 1555835>.

Berchtold, M. Processing sensor data with the common sense toolkit (CSTK), [online] Lancaster Ubiquitous Computing Group, Mar. 4, 2005. Retrieved from the internet:<URL: http://www.teco.edu/~berch/other_docs/ProcessingSensordataWithTheCSTK.pdf>.

Denning, PJ. Sparse Distributed Memory. American Scientist 77 (Jul.-Aug. 1989), pp. 333-335 [online], Retrieved from the internet <URL:http:www.cs.gmu.edu/cne/pjd/PUBS/amsci-sdm.pdf>.

\* cited by examiner

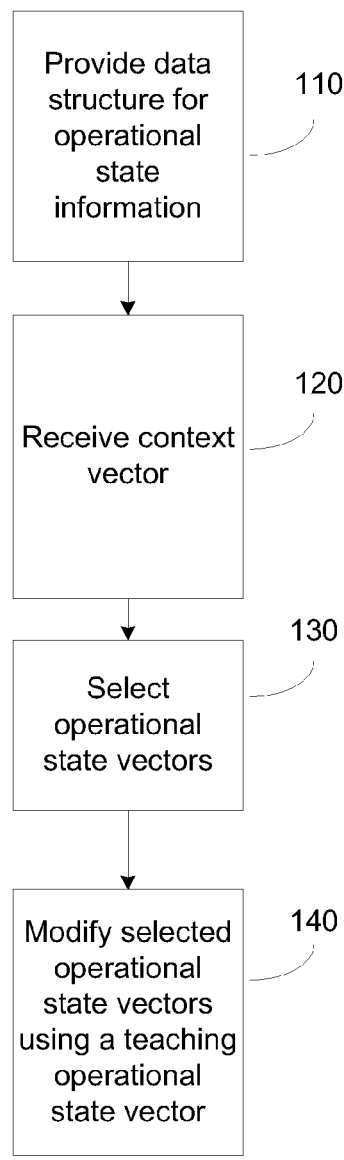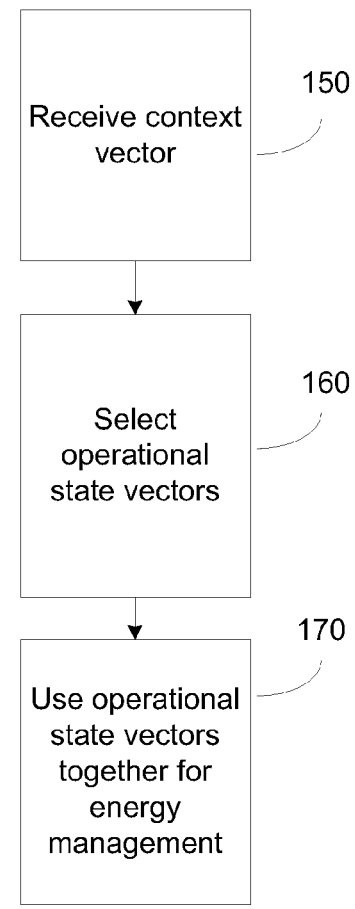
Fig. 1a
Fig. 1b

METHOD, DEVICE AND SYSTEM FOR ENERGY MANAGEMENT

RELATED APPLICATION

This application was originally filed as PCT Application No. PCT/FI2011/050226 filed Mar. 16, 2011.

BACKGROUND

The development of computers into hand-held and mobile devices has led to a situation where these devices are used in many different environments and situations, that is, in different contexts. In addition, there are a large number of applications available for these devices, each using the device's resources differently. Also users have different needs and preferences how they operate such devices. At the same time, the demands on energy efficiency and time of use are increasing.

There are known energy management systems that may e.g. put some elements of a device in a low-power mode when these elements are not needed. The well-known screen saver feature is an example of such a system: when there is no user activity, the screen is dimmed or blanked completely. Some computer systems spin down the hard disk when there has been no data access for a while. Thus, the operation of the device may be adapted to the user's needs according to the current context.

However, there is a vast number of different contexts that may be relevant to the task of energy management. Furthermore, it may sometimes be difficult to carry out energy management even though the context is known—it may not be known, which elements are needed or are not needed in such a context.

There is, therefore, a need for a solution that makes it easier and more efficient to carry out energy management.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

The different example embodiments relate to carrying out energy management based on context information. In the method, device and system according to the example embodiments, a context vector is used to select a plurality of operational state vectors. The context vector may be indicative of environmental variables, statuses and profiles of applications on the system, as well as device/system status information and user preferences. The plurality of operational state vectors are indicative of the state and/or energy consumption of different operational units in the corresponding context. The selected operational state vectors are then used together in adapting an operational state of the operational units according to the needs in the context. There is also a method and devices for forming a data structure that can be used in the selection of the operational state vectors.

According to the example embodiments, the individual elements defining the context are understood as a context vector. For example, matters like applications running on the system and the user's needs as well as environmental variables like lighting may be such elements of the context. These elements are used directly to select a plurality of operational state vectors, possibly without the need of determining the actual context from the operational state vector elements. This means that there are a number of different results for the same context vector. These results define the different state of the different operational elements associated with the context vector. In other words, there are a plurality of—possibly different—operational state results associated with the context vector for an individual operational unit. These results are then used together to determine how the energy management is carried out.

According to a first aspect, there is provided a method comprising: providing a data structure comprising context vectors and operational state vectors and having an association between the context vectors and the operational state vectors, receiving a context vector, using the context vector to select a plurality of operational state vectors, the plurality of operational state vectors being indicative of operational state of operational units, and modifying the selected operational state vectors using a teaching operational state vector associated with the context vector.

According to an embodiment, the method comprises modifying the selected operational state vectors by increasing the value of the elements corresponding to an active operational unit in the teaching operational state vector. According to an embodiment, the method comprises modifying the selected operational state vectors by decreasing the value of the elements corresponding to an inactive operational unit in the teaching operational state vector. According to an embodiment, the method comprises using a distance measure in the selecting, and modifying the selected operational state vectors according to the distance measure. According to an embodiment, the method comprises thresholding the teaching operational state vector, and modifying the selected operational state vectors using the thresholded teaching operational state vector.

According to a second aspect, there is provided a method comprising: receiving a context vector, using the context vector to select a plurality of operational state vectors, the plurality of operational state vectors being indicative of operational states of operational units, and using the selected operational state vectors together in energy management of the operational units.

Embodiments of the first and second aspects will be described next. According to an embodiment, the operational state vectors reside in an associative memory such as a sparse distributed memory, and the method comprises inputting the context vector as a single memory address input to the associative memory, and selecting a plurality of data vectors from the associative memory based on the input address. According to an embodiment, the method comprises choosing the associative memory among a group of associative memories based on the received context vector, and selecting the plurality of data vectors in the selected associative memory using the context vector. According to an embodiment, operational state vectors have an associated context address, and the method comprises carrying out the selection by comparing the context vector to the context addresses. According to an embodiment, the possible address space of context addresses comprises more entries than the total number of context addresses associated to operational state vectors, and the addresses of the memory locations having been assigned to the operational state vectors using a function. According to an embodiment, the function is a random function. According to an embodiment, the function corresponds to a statistical distribution of context vectors. According to an embodiment, carrying out the selection comprises forming a distance measure between the received context vector and another vector. According to an embodiment, calculating the distance measure comprises forming a Hamming distance. According to an embodiment, calculating the distance measure comprises forming a dot product. According to an embodiment, the method comprises forming the context vector by combining data from at least two time instances. According to an embodiment, the method comprises forming the context vector by combining a vector describing a current context and a vector describing an earlier context. According to an embodiment, the method comprises using application information provided by an application in forming the context vector. According to an embodiment, the context vector is indicative of an environmental variable such as temperature, time, location, altitude, acceleration, attitude, lighting, noise conditions and humidity. According to an embodiment, the context vector is indicative of the state of the apparatus such as an operating profile, user profile, user preferences, availability of a keyboard, use of keyboard, availability of a touch input apparatus, memory usage and availability, processor status information, network information, mass storage access information energy source information and energy supply conditions. According to an embodiment, the context vector is indicative of the state of software applications such as registered applications, running applications, application types, data types used by applications, application activity information, information on number of threads applications are using, and processor and memory load information of applications. According to an embodiment, the operational state vectors have been formed by selecting former operational state vectors as in the first aspect, and the method comprises modifying the selected operational state vectors using a teaching operational state vector associated with the context vector. According to an embodiment, the method comprises forming an energy management vector from the selected operational state vectors. According to an embodiment, forming the energy management vector comprises summing the operational state vectors. According to an embodiment, forming the energy management vector comprises forming bit representations of operational states of operational units. According to an embodiment, forming the energy management vector comprises determining a certainty of an operational state. According to an embodiment, the method comprises determining the certainty using the magnitude of the corresponding elements of the operational state vectors. According to an embodiment, forming the energy management vector comprises summing the operational state vectors to obtain a sum vector, and determining the certainty comprises using the magnitude of the sum vector. According to an embodiment, the method comprises repeating the selecting step iteratively by using results from a previous iteration in the context vector. According to an embodiment, the energy management comprises altering the operational state of at least one of the group of an apparatus, a display, a memory, a processor, a hardware accelerator, a network block, a radio block, a sub-block of a processor and a sub-block of a hardware accelerator.

According to a third aspect, there is provided a data structure comprising context vectors and operational state vectors and an association between the context vectors and the operational state vectors, the data structure being suitable for obtaining control data for controlling an operation of an apparatus by using an input context vector to select a plurality of operational state vectors from the data structure, the plurality of operational state vectors being indicative of operational states of operational units, and controlling operation of an apparatus using the selected operational state vectors together to carry out energy management for the operational units. According to an embodiment, the data structure has data elements suitable for use with the second aspect.

According to a fourth aspect, there is provided a computer-readable memory comprising the data structure of the third aspect.

According to a fifth aspect, there is provided an apparatus comprising a processor, memory, computer program code in the memory and a data structure according to the third aspect in the memory, and operational units whose energy consumption is manageable by the computer program code according to the second aspect when the computer program code is run on the processor.

According to a sixth aspect, there is provided an apparatus comprising means for processing information, means for storing information, operational units for carrying out operations, means for running software applications interacting with the operational units, means for carrying out a method according to the second aspect for carrying out energy management of the operational units.

According to a seventh aspect, there is provided an apparatus comprising at least one processor, memory, operational units, and computer program code in the memory, the computer program code being configured to, with the at least one processor, cause the apparatus at least to receive a context vector, use the context vector to select a plurality of operational state vectors, the plurality of operational state vectors being indicative of the operational state of the operational units, and use the selected operational state vectors together in energy management of the operational units.

According to an embodiment, the apparatus comprises an associative memory such as a sparse distributed memory, operational state vectors residing in the associative memory, and computer program code configured to cause the apparatus at least to input the context vector as a single memory address input to the associative memory, and select a plurality of data vectors from the memory base on the input address. According to an embodiment, the apparatus comprises means for producing the context vector. According to an embodiment, the apparatus comprises different sub-units of the operational units, and means for enabling and disabling or setting the operational state of the sub-units for managing energy consumption.

According to an eighth aspect, there is provided a system comprising at least one processor, memory, operational units, and computer program code in the memory, the computer program code being configured to, with the at least one processor, cause the system at least to receive a context vector, use the context vector to select a plurality of operational state vectors, the plurality of operational state vectors being indicative of the operational state of the operational units, use the selected operational state vectors together in energy management of the operational units.

According to an embodiment, the system comprises means for carrying out the method according to the first or second aspect. According to an embodiment, the forming of the context vector is carried out at a user apparatus. According to an embodiment, the selecting of the operational state vectors is carried out at a user apparatus. According to an embodiment, the selecting of the operational state vectors is carried out at a network server. According to an embodiment, the energy management is carried out at the user apparatus. According to an embodiment, the energy management is carried out at the server. According to an embodiment, the system is a network service system for providing a network service to a user of the user apparatus via a web browser.

According to a ninth aspect, there is provided a computer program product stored on a non-transitory computer readable medium and executable in a data processing apparatus, the computer program product comprising computer program code sections for carrying out the method according to the first or second aspect.

According to a tenth aspect, there is provided a computer program product stored on a non-transitory computer readable medium and executable in a data processing apparatus, the computer program product comprising a computer program code section for providing a data structure comprising context vectors and operational state vectors and having an association between the context vectors and the operational state vectors, a computer program code section for receiving a context vector, a computer program code section for using the context vector to select a plurality of operational state vectors, the plurality of operational state vectors being indicative of operational states of operational units, and a computer program code section for modifying the selected operational state vectors using a teaching operational state vector associated with the context vector.

According to an eleventh aspect, there is provided a computer program product stored on a non-transitory computer readable medium and executable in a data processing apparatus, the computer program product comprising a computer program code section for receiving a context vector, a computer program code section for using the context vector to select a plurality of operational state vectors, the plurality of operational state vectors being indicative of operational states of operational units, and a computer program code section for using the selected operational state vectors together in energy management of the operational units.

According to a twelfth aspect, there is provided a computer program product stored on a non-transitory computer readable medium and executable in a data processing apparatus, the computer program product comprising computer program code sections for carrying out data processing on at least one processor, at least one associated application state information vector indicative of at least one state of the computer program product when the computer program product is being executed, and at least one associated operational state vector indicative of the state of at least one operational unit or sub-unit used by the computer program product when the computer program product is being executed, wherein the at least one application state information vector and the at least one operational state vector correspond to each other.

DESCRIPTION OF THE DRAWINGS

In the following, various embodiments of the invention will be described in more detail with reference to the appended drawings, in which FIGS. 1a and 1b show methods for energy management and for forming a data structure for the same purpose according to an example embodiment;

DESCRIPTION OF THE EXAMPLE EMBODIMENTS

Figure 2A:
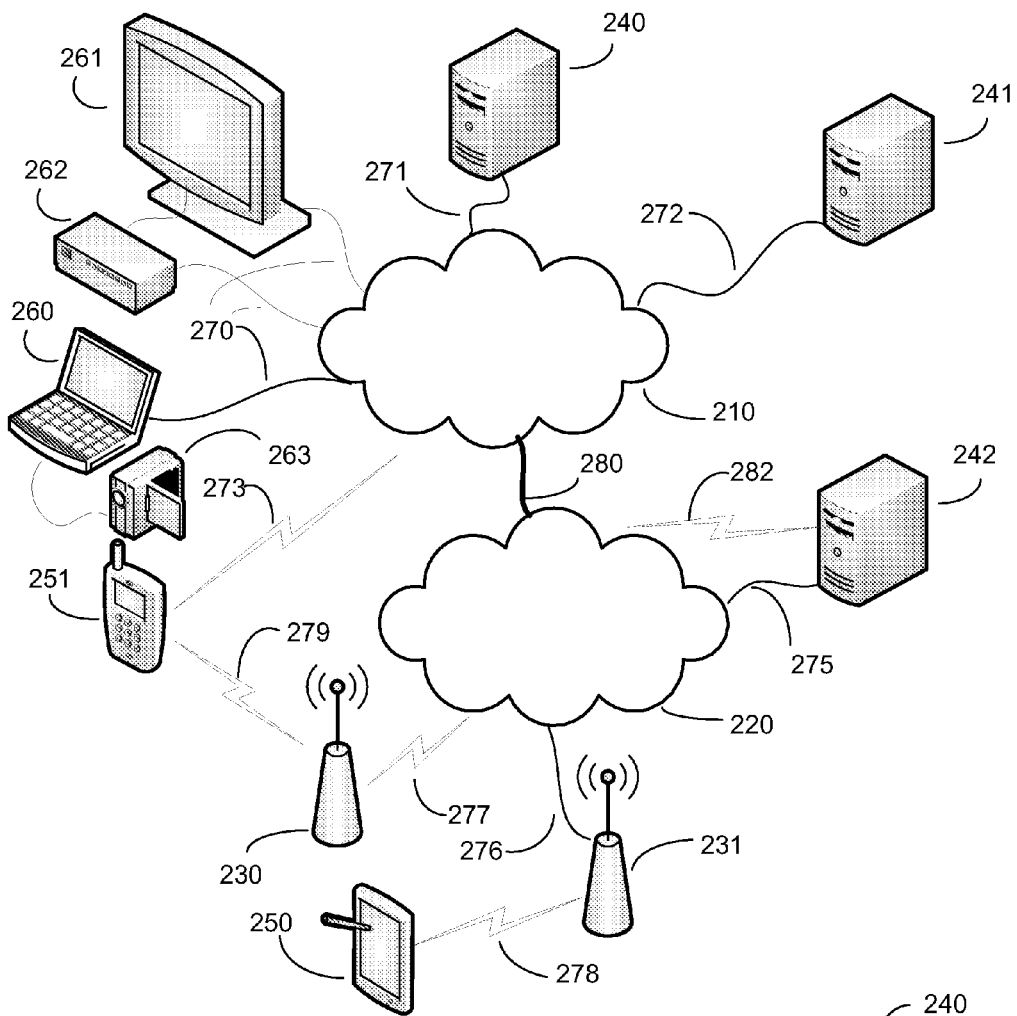
FIGS. 2a and 2b shows a system and devices where energy management may be carried out.

In the following, several embodiments of the invention will be described in the context of energy and power management of a mobile device (energy management and power management may be understood to be equivalent). It is to be noted, however, that the invention is not limited to mobile devices only. In fact, the different embodiments may have applications widely in any environment where power and energy management is required.

Energy management may be useful due to the fact that mobile devices are often battery-operated devices and run on a limited power supply. Additionally, such devices like mobile phones and computers are becoming smaller in physical size which can make excessive power consumption heat them up more easily. Battery technology improves at a steady rate, but may not always be able to keep pace with the continuous increase of processing performance and resource usage. Current battery technology may not offer the energy densities for eliminating the power consumption challenge.

It has been noticed here that one of the challenges of system-level approaches to power management may be to orchestrate the different unit-level power management techniques. Optimal power management at the level of individual operational units may result in suboptimal results at the system level because the complex interactions between applications, context and resources affect the total power consumption. For example, it has been noticed here that a conventional energy management system aiming to control the energy consumption of a large number of operational units and sub-units may become so complex that the energy consumption and processing requirements of the energy management system become too high. The system according to the example embodiments may offer a solution for managing this complexity in a simple way and achieving more optimal results at the system level.

Actual implementations of energy management can be realized through using both hardware and software approaches. A hardware approach may often be emphasized since hardware is the part physically draining energy from the battery. From this viewpoint, it makes sense to focus on hardware optimizations. However, since the only mission of hardware is actually to fulfill software needs, one can argue that software is the ultimate consumer of energy and therefore the focus should be on software optimizations. Extensive research has been produced on both hardware and software sides. The approaches should not be considered mutually exclusive, but rather synergistic in nature. Hardware should ideally provide an optimal trade-off between energy and other non-functional attributes such as performance. On the other side, software should strive to use those hardware pathways offering the optimal trade-offs for the application at hand. On the other hand, the applications and their interaction with the underlying platform play an important role in energy management.

Energy aware system management may rely on techniques of collecting and analyzing information on the status of subsystems, operational units or processors while the system is running applications. However, it has been noticed here that the overhead of collecting information using software while the system is running may be so large that performance of the system may be deteriorated. Therefore, it may be advantageous to design a power management unit which collects information of software/hardware in such a manner that the performance of the system is not degraded. In the embodiments of the present application, an energy management system is presented that may collect status and information patterns while applications are being executed. The energy aware management may then be carried out based on the collected application, context, and resource information.

The embodiments described in this application may enable creating a system-level power management system that associates application and context information pattern information with operational unit resource pattern information in simply and efficient way. This may be carried out e.g. by utilizing a Sparse Distributed Memory (SDM) as computing architecture (other associative memory models may also be used) for power management system purpose. The present application introduces a system-level energy management solution for mobile devices and computers incorporating the concept of application and context to select the optimal resource allocations.

One of the challenges of system-level approaches to power management may be understood to be to orchestrate the different device-level energy management techniques. Optimal energy management at the level of individual operational units or sub-units may result in suboptimal results at the system level because the complex interactions between resources and applications affect the total power consumption. The embodiments of the system may help in managing this complexity and improving system-level energy management. In the present system, three spaces may be defined (application, context, and resource spaces) so that each of them comprises a number of variables. In the following the more detailed description of spaces will be given.

Application Space

The role of the application space is to provide a central pattern description for applications to register and unregister to and from the system. Application states may be e.g. "playing an MP3 file" for the music player application, or "recording a video" in the case of the video camera application. In the case of a browser application, examples of valid states may include "displaying a web page" and "loading a page from the web" which would include fetching the content, establishing the layout and rendering it. One application state may imply the use of one or more resources from one or more operational units. For example, loading a page may require network access and processing power but no display until there's data to show. The application variables may define an n-dimensional application space, where n is the number of variables. The number of variables may be high, e.g. tens or hundreds.

Context Space

The context space may be understood to be responsible for gathering all context-related information in the system. The gathering methods may differ for different context data, since such data may be distributed across the system. In practice the context space may use other services and components in the system, for instance to get information about applications. The context variables define an n-dimensional context space, where n is the number of variables. The number of variables may be high e.g. tens or hundreds.

Context information in the scope of the context space may refer to any data related to the environment, the user, or the conditions on the terminal. It needs to be noted that the term context may also encompass the application statuses as described earlier. A non-extensive list of possible data to include in the data gathered by the context space is presented below.

Temperature information. Temperature of the battery, processor, cover, and different parts of the terminal.
Energy source information. Type and capacity of the battery, parameters, voltage, power sources, connection to an external charger.
Power information. Power drained from the battery.
User profiles for the system operation. This may include desired behavior (for example, power performance trade-offs) and other user-definable tuning.
User preferences. All user specified settings that affect the operation of the system (like the preferred connection bearer, connection settings, or display brightness).
Processor information. Cellular and application processor load, DSP load, graphics accelerator load, processes, threads.
Memory levels. Free execution memory, stack and heap used, free space in the flash, main storage or hard drive.
Network information. Active connections, available and used band-width, bearers, and sockets.
File server information. Readers and writers, writing speeds, storage media, and usage levels.
Keypad usage. This category aims to answer the question of whether the user is actively interacting with the device.
Environmental information. Data coming from different sensors on the phone, such as the ambient light sensor or microphone.

Resource Space

The resource space provides information about system status and the operational state of different operational units. The resource space may also abstract operational resources by providing interfaces for the power management functionality. In practice, this goal may be met by exposing several resource states with different power-performance ratios and transition costs to the interfaces, whereby it may not be necessary to know how to manage the individual operational units and their sub-units. The resource space maps resource states to specific changes on an operational unit. These changes are typically mediated through the available device drivers for the operational units.

System awareness and resource data sharing may be another responsibility of the resource space. The resource space may maintain information about allocated and available physical resources. Regarding the operational resources, the resource space has the capability to gather, calculate, and share information about power consumption, energy capacity, and thermal conditions of different operational units and on the system level. The number of resource space sub-modules in the system may depend on the system composition. The resource variables define an n-dimensional resource space, where n is the number of variables. The number of variables may be high, e.g. tens or hundreds.

FIGS. 1a and 1b show methods for energy management and for forming a data structure for the same purpose according to an example embodiment. In the methods according to an example embodiment, context data such as sensor readings and other information on the context of the system as well as application state information on applications running on the system are used for power/energy management. The energy management is carried out by determining preferred operational states of operational units in the system based on the context vector.

It may be possible to recognize a context, and then carry out energy management based on what the operational requirements of the system are in the recognized context. It has been noticed in the present invention that a problem of this approach may be that once the context is recognized, the system may have difficulty to decide how the system should react to the context. An underlying problem may be that simply by knowing what the context is, it may still not be known what operational needs there are in this context, that is, what operational units are needed and how much. However, the earlier concepts are based on the system recognizing one context out of a limited number of pre-defined ones. The number of pre-trained contexts in the system may be selected by the system developers and there may be a risk that the system enters an unknown context, and the system classifies the context incorrectly. As a result, the energy management may be carried out in a wrong manner, causing disturbance to the user, since some of the operational units may not be available when needed.

The example embodiment comprises a system that associates a number of context variables such as sensor readings representing the properties of the system context (but not trying to classify the situation into one of a number of predefined contexts), and associating the context variables with a known (or trained) set of operational states of operational units in the situation. This may be done by creating a Sparse Distributed Memory (SDM) as computing architecture. Other associative memory models may also be used, such as those based on self-organizing maps or learning vector quantization. The direct association of the context or sensor variables to operational state data may help to solve the aforementioned problems that have been identified here. By creating this direct association e.g. by training/teaching the system with training data on statuses of operational units, it may not be necessary to recognize the context as such (e.g. "taking video", "running a spreadsheet application", "playing a game"), but instead the needed operational units or the required system resources may be directly determined by using the association.

In FIG. 1a, an example method for forming a data structure and data suitable for use in energy management is shown. In phase 110, the underlying data structure is provided e.g. on a computer-readable medium such as a volatile or non-volatile memory, hard disc, USB memory or over the network. The data structure may have addressable locations for storing operational state vectors for operational units, and possibly addresses corresponding to the operational state vectors. The data structure may be a so-called sparse distributed memory (SDM) or another type of an associative memory. Such a memory may be suitably initialized.

In phase 120, a context vector is received. The context vector may comprise e.g. bit representations of context variables such as environment variables, information on the state of the system and states of applications on the system. The context vector may be a comparatively long vector, e.g. 500, 1000, 2000 or more bits long. The length of the context vector may depend on the size of the addressable operational state vector memory. The context and application state vector may be indicative of an environmental variable such as temperature, time, location, altitude, acceleration, attitude, lighting, noise conditions and humidity. The context and application state vector may also be indicative of the state of the device such as an operating profile, availability of a keyboard, availability of a touch input device and power supply conditions. The context and application state vector may also be indicative of a state of an application on the system. The context and application state vector may also comprise earlier (history) data of the context, e.g. sampled with the sampling rate of 1 s, 1 minute or 1 hour, and concatenated with the current context and application state vector.

For simplicity, the context and application state vector will be called the context vector in the following description. It is to be understood that the context vector may comprise information on the environment, information on applications and software on the system, and information on the system state, as well as history data on the same, and other information.

In phase 130, the context vector or one or more parts of it may be used to select a plurality of operational state vectors. This may be achieved by comparing the context vector and the addresses of the operational state vectors. The operational state vectors whose corresponding address is sufficiently close to the context vector may then be selected. For example, a Hamming distance between the context vector and the addresses may be used for carrying out the selection. Alternatively, a dot-product based distance measure may be used.

In phase 140, the selected operational state vectors may be modified in order to train the data structure to output a matching operational state vector when a context and application state vector is presented to the data structure. The training may happen e.g. so that a training or teaching operational state vector is used, and the operational state vectors in the data structure are modified as indicated by the training vector. For example, the elements of the operational state vectors that correspond to those elements in the training vector indicating active state of an operational unit may be incremented. Similarly, the elements of the operational state vectors that correspond to those elements in the training vector indicating inactive state of an operational unit may be decremented.

In FIG. 1b, an example method for using a data structure and data in energy management is shown. In phase 150, a context vector is received. The context vector may comprise e.g. bit representations of context variables such as environment variables, information on the state of the system and states of applications on the system. The context vector may be a comparatively long vector, e.g. 500, 1000, 2000 or more bits long. The length of the context vector may depend on the size of the addressable operational state vector memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application on the system. The context vector may also comprise earlier (history) data of the context, e.g. sampled with the sampling rate of 1 s, 1 minute or 1 hour, and concatenated with the current context vector.

In phase 160, the context vector or one or more parts of it may be used to select a plurality of operational state vectors. This may be achieved by comparing the context vector and the addresses of the operational state vectors. The operational state vectors whose corresponding address is sufficiently close to the context vector may then be selected. For example, a Hamming distance between the context vector and the addresses may be used for carrying out the selection.

In phase 170, the selected operational state vectors are used together in energy management of the system and its operational units, or merely to provide information for energy management (e.g. to a remote location controlling energy management such as a web service). The vectors may be used together e.g. by summing them. A positive element may be indicative that an operational unit is needed in this context, and a negative element may be indicative that an operational unit is not needed in this context. An element of zero or close to zero may indicate that the necessity of an operational unit in the system is not known in this context. The operational state information of the individual operational elements may be used for energy management either individually or together with each other as input to the energy management process.

Figure 2B:
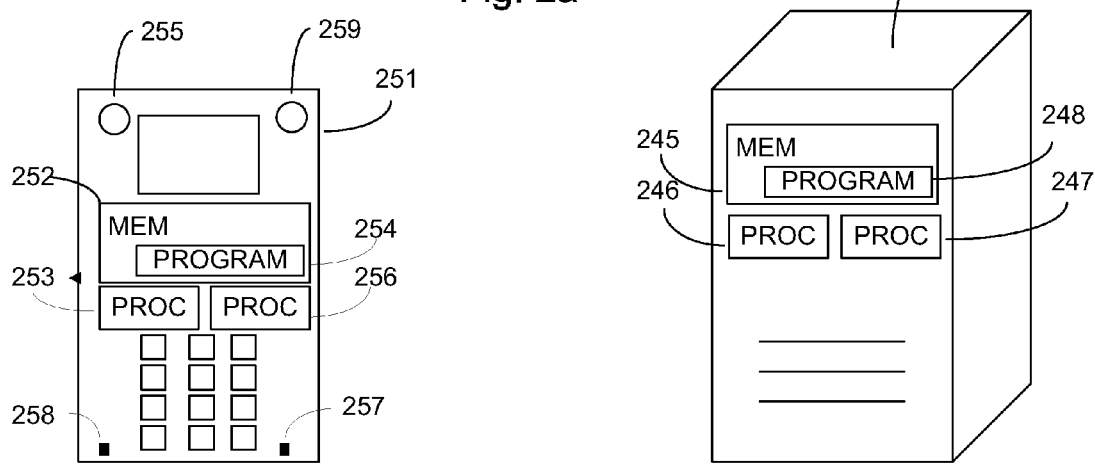

FIGS. 2a and 2b shows a system and devices where energy management may be carried out according to an embodiment. In FIG. 2a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2a are shown a server 240 for offering a network service and connected to the fixed network 210, a server 241 for storing data in the network and connected to the fixed network 210, and a server 242 for offering a network service connected to the mobile network 220. Some of the above devices, for example the servers 240, 241, 242 may be such that they make up the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 2b shows devices where energy management may be carried out according to an example embodiment. As shown in FIG. 2b, the server 240 contains memory 245, one or more processors 246, 247, and computer program code 248 residing in the memory 245 for implementing, for example, the functionalities of a software application like a spreadsheet, video processing or a computer game. The different servers 240, 241, 242 may contain at least these same elements for employing functionality relevant to each server. Similarly, the end-user device 251 contains memory 252, at least one processor 253 and 256, and computer program code 254 residing in the memory 252 for implementing, for example, the functionalities of a software application like a spreadsheet, video processing or a computer game. The end-user device may also have one or more cameras 255 and 259 for capturing image data, for example video. The end-user device may also contain one, two or more microphones 257 and 258 for capturing sound. The different end-user devices 250, 260 may contain at least these same elements for employing functionality relevant to each device. The end user devices may also comprise a screen for viewing a graphical user interface.

It needs to be understood that different embodiments allow different parts to be carried out in different elements. For example, execution of a software application may be carried out entirely in one user device like 250, 251 or 260, or in one server device 240, 241, or 242, or across multiple user devices 250, 251, 260 or across multiple network devices 240, 241, or 242, or across both user devices 250, 251, 260 and network devices 240, 241, or 242. For example, the data for creating the user interface may be stored in one device, the forming of the application interface may happen in another device and the input and output functionalities of the user interface may be carried out in a third device. The different application elements and libraries may be implemented as a software component residing on one device or distributed across several devices, as mentioned above, for example so that the devices form a so-called cloud.

The different embodiments may be implemented as software running on mobile devices and optionally on devices offering network-based services. The mobile devices may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various sensors e.g. detecting the temperature, humidity, lighting conditions, ambient sound conditions, altitude, acceleration and speed, as well as location, attitude and others.

Figure 3:
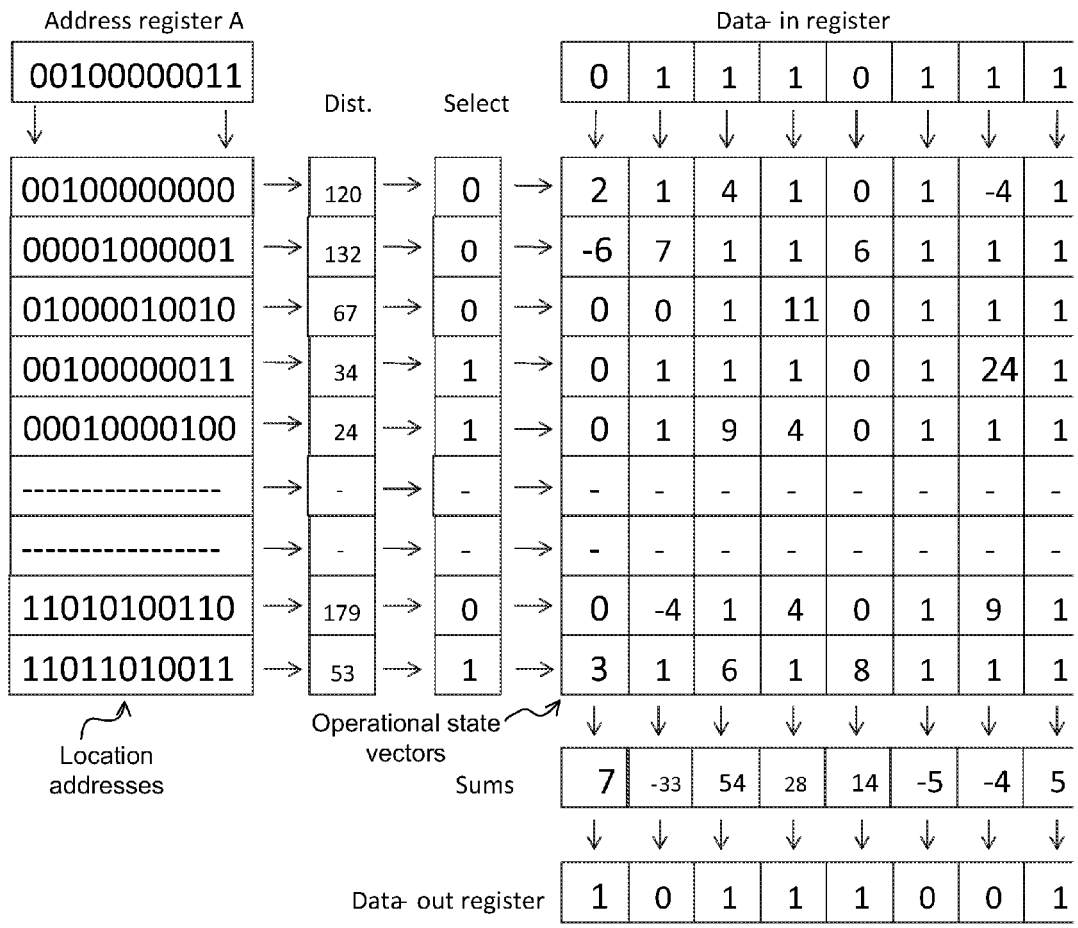
FIG. 3 shows an organization of a memory for storing operational state information according to an example embodiment.

FIG. 3 shows an organization of a memory for storing operational state information according to an example embodiment. In the example embodiment, a type of an associative memory called a Sparse Distributed Memory (SDM) is used as the data structure for storing operational state information of operational units (and/or system resource information, if the operational state information has been abstracted to such in an energy management interface). The SDM architecture may encompass a suitable number of physical locations (e.g. 1,000,000) and a large address pattern size (e.g. 1,000 bits). Each location may be assigned an address (a 1,000-bit pattern) using a function, e.g. at random, and the set of location addresses constitutes a sparse subset of the memory space. The memory may have an input register for the cue (address) pattern and an input register for the data pattern (for training), and it may have a register for an output pattern (these registers may hold e.g. 1,000 bits or another number, similar or dissimilar to each other). The memory may comprise a large number of operational state vectors in the locations corresponding to the location addresses.

The function used to assign the locations their addresses may be a random function. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory.

The input and/or output vectors may be variable in size. This may be implemented so that there are zero-padding bits at the end or at a certain location in the vector, and when new input or output data is taken into use, some or all of the zero-padding bits are used for this purpose. In this way, the data content inside a vector may grow. The vector may also grow or diminish in length so that new bits are added to the vector at a given location, e.g. at the end. If the size of the vector changes, the size of the location addresses and/or the size of the operational state vectors may be changed correspondingly. The zero-padding, i.e. reserving space for new data in advance, may be advantageous in a dynamic system where new applications may be installed on the system. For example, the data corresponding to the different states of a new application may be added to the context vector, and the operational state vectors may be trained for the added application.

It may be feasible to use masks with the input or output vectors. The masks may indicate "don't care" variables and/or bits that e.g. will not be used in the address comparison. Selective training may be implemented with the help of masks, as well, since the operational state training vector may be concentrated on those operational units that a certain context has an impact on, e.g. so that an application requiring certain system resources like graphics acceleration provides an operational state training vector for such operational units.

In addition to, or instead of masks, an input context vector or an input operational state vector may be subjected to a mapping through a memory model of its own prior to sending it to the main memory model. In this way, the input vector may be cleared of noise or otherwise modified before it is used. Examples of such modification may be found in FIGS. 6a, 6b and 6c.

Each location may have an address decoder that compares its own address with the input cue (in the figure, the pattern "00100000011"), selecting that location as a participant in the next storage or retrieval operation whenever the cue is within a specified distance d (e.g. "less than 60" in the figure) of the location's address. In FIG. 3, the 4th, 5th and the last location have been selected to participate as indicated by "1" in "select" column.

The context vector and the addresses may be encoded such that a distance measure works well in determining their similarity. For example, a temperature between −15 and 35 degrees centigrade may be coded with 11 bits. A temperature of 5 degrees more would add one "1" to the bit string, for example so that −5 degrees would be represented by the string "11100000000", the temperature of +10 degrees would be represented by "11111100000" and 30 degrees by "11111111110". Other representations are of course possible, too, such representations may concentrate on describing the pattern of the input data, e.g. by spectral components or such. The status of applications may be also encoded, as well, for example so that there are one or more bits indicating that a certain application is running, others indicating the state of the application (idle, processing, waiting for input) or the demand of the application such as allocated memory, threads in use, percentage of processor power etc.

As an example, approximately 1/1000 of the physical locations may be selected by any given input cue (address). To retrieve e.g. a 2,000-bit pattern corresponding to input cue A, the memory may work as follows. The sphere of selected locations is formed as described above. A set of 2,000 output element values is constructed from all the selected locations by summing all the corresponding selected vectors; for example, the output element value in output bit position 2 is the sum of the bit-2 vector elements (counters) of each selected physical location. The 2,000-bit output pattern may be constructed from the 2,000 output counters by a threshold method: if an output counter is nonnegative, that output bit is 1, otherwise it is 0.

The SDM model is sparse because the physical locations are a small subset of the memory space; it is distributed because a pattern is stored in many locations and retrieved by statistical reconstruction from many locations. Distribution may enable the memory to retrieve a stored pattern when the input cue only partially matches any stored pattern, an ability that may arise from the large overlap between the spheres of selected locations of two similar cues. It may also render the memory robust in case of failure of portions of the addressing or storage hardware.

These properties may make the memory more reliable for determining the operational state vectors corresponding to different context vectors.

The memory may be able to form associations between patterns without ever being explicitly taught those associations, because the distance between two patterns may be sufficiently small that the one pattern retrieves the other. Similarly the memory may be able to retrieve a forgotten pattern from a cue (address) that seemingly had nothing to do with it, giving the impression of generating a new pattern. It may e.g. retrieve the pattern corresponding to "maple leaves" that was formed internally after storing many patterns encoding specific maple leaves. It may appear to store patterns in lists representing their temporal order, and begin an iterative retrieval from anywhere in the list. Fast convergence of an iterative search may be interpreted as "knowing that you know" and non-convergence as "knowing that you don't know". These properties may be used to determine certainty of the output.

An SDM system and its operations compared to an ordinary contemporary computer memory may be described as follows.

An ordinary computer memory is a memory for short strings of bits, typically 8, 16, 32, or 64 bits. The bit strings are often thought of as binary numbers or "words," but, in general, they are just small patterns of bits. The memory stores them in addressable locations. The addresses to the memory also are short strings of bits. For example, 20 bits will address a memory with approximately one million locations.

A sparse distributed memory is likewise a memory for strings of bits, except that the strings may be hundreds or thousands of bits long. Because the strings are so long, they are best thought of as large patterns. The addresses to the memory are also long strings of bits, or large patterns.

The behavior of an ordinary computer memory can be described as follows: If the word W has been written with address A, then W can be read back by addressing the memory with A, and we say that A points to W. The condition for this is, of course, that no other word has been written with address A in the meantime (overwriting W).

A sparse distributed memory may have the following behavior: If the pattern W has been written with pattern A as the address, then W can be read back by addressing the memory with A, and we say that A points to W. However, the conditions for this may be more different than they are with ordinary computer memories, namely, that no other pattern has been written before or since with address A or with an address that is similar to A.

This difference may pay off in noise tolerance in two ways: To read the pattern W from a sparse distributed memory, the address pattern may not need to be exactly A (in ordinary computer memory, the exact address A must be used to read W). This means that the SDM memory may be able to tolerate noisy reference address; it may be able to respond to a partial or incomplete cue. Tolerance for noisy data shows up as follows: If many noisy versions of the same target pattern have been written into the memory, a (nearly) noiseless target pattern may be possible to be read back.

There may be one associative (e.g. SDM) memory structure for operating in all conditions. Alternatively, there may be two, three or more at least partly different memory structures one of which may be selected according to a criterion. For example, there may be one data structure for work use, another for private use, and a third for travel use. There may also be a plurality of data structures that compete with each other and the one that delivers the most reliable result may be used. The reliability may be determined from the values of the selected operational state vectors and/or their sum vector.

Figure 4A:
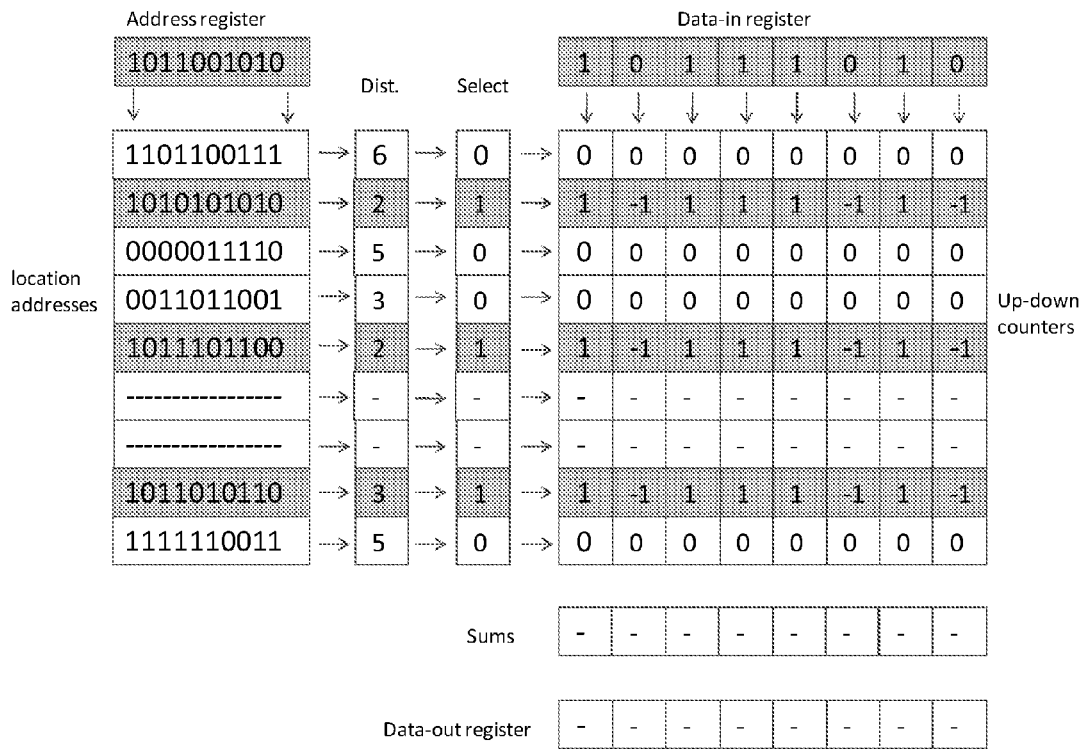
FIGS. 4a and 4b illustrate how operational state information may be written into a memory according to an example embodiment.
Figure 4B:
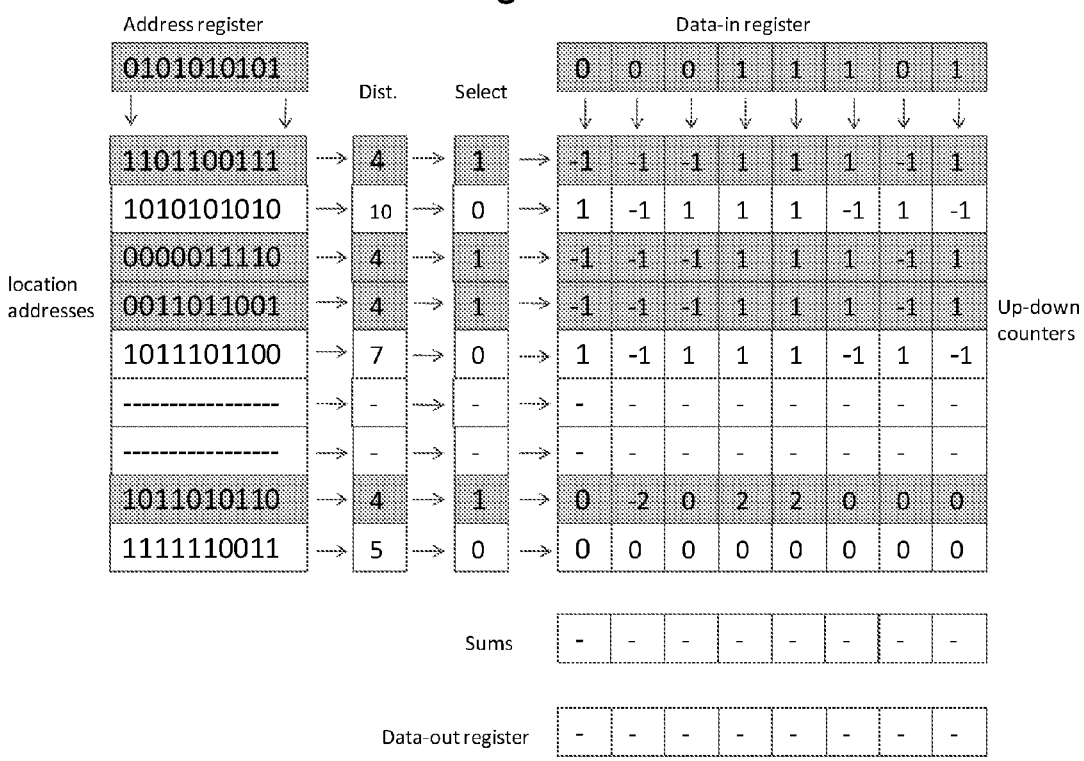

FIGS. 4a and 4b illustrate how operational state information may be written into a memory according to an example embodiment. To store a 2,000-bit data pattern at address A, the memory may work as follows. The input cue pattern A (in the figure, the pattern "1011001010") is presented to the memory, and all locations within a certain Hamming distance from A select themselves (in FIG. 4a, the 2nd, the 5th and the previous to the last location have been selected). This set of selected locations is called the sphere selected by A. A copy of the input data pattern (in the figure, the pattern "10111010"), which is to be associated with A, is then entered into each of the selected locations. Because any given location is within the spheres of selection of many distinct cue patterns, entering a new value may be arranged not to obliterate the previous contents of the location. This may be accomplished e.g. by implementing each location as a set of 2,000 counters, one for each bit position of the data. Data are entered by adding 1 to each counter for which the corresponding data bit is 1, and subtracting 1 from each counter for which the corresponding data bit is 0. 8-bit or 16-bit counters may be adequate for most applications.

A (data) pattern is written from the data-in register into the memory e.g. by adding it into all selected locations (in an ordinary computer memory, new data would replace old data in one location). The data may be added simply by incrementing the counters under the ones of the data-in register and by decrementing the counters under the zeros. The modification of the memory vectors may be done also so that it is dependent on the distance formed in the selection phase e.g. so that locations having a smaller distance are modified more than locations having a larger distance. A neighborhood function may be used for determining the amount of modification.

FIG. 4b shows the writing of a second pattern into the same memory as in FIG. 4a. Corresponding to the incoming context vector (address) of "0101010101", the 1st, 3rd, 4th and the previous to the last location have been selected. The corresponding elements based on the input teaching pattern "00011101" are incremented and decremented, as before. As more and more data are written into the memory, individual counters may reach their capacity. When this happens, attempts to increment a counter past its maximum value or to decrement it past its minimum value are ignored.

The system may be trained for energy management by arranging a number of training situations, covering many different contexts and application uses. The used operational units and their states may be measured continuously during training. When the activity and state of the operational units are given numeric values as described above, these may be associated with the current context and application state readings. Hence, later on (during use), a user may simply carry his device, and the system may create an association between current context and application vector and the needed operational states of the operational units. As described earlier, the system may also be trained for new applications by adding data to the context vector corresponding to the states of the new application, and training the operational state vectors for the new application. This training may happen e.g. with the help of masking the context and teaching operational state vectors or without masks, as described earlier.

Figure 5A:
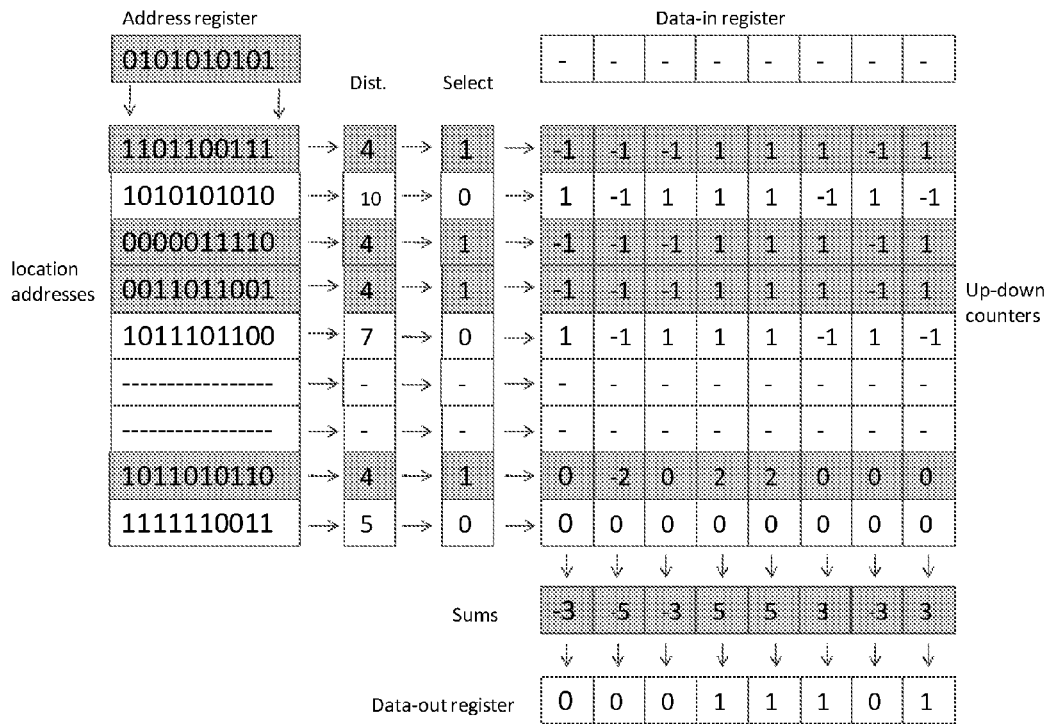
FIGS. 5a and 5b show how operational state patterns may be determined using a memory according to the invention.
Figure 5B:
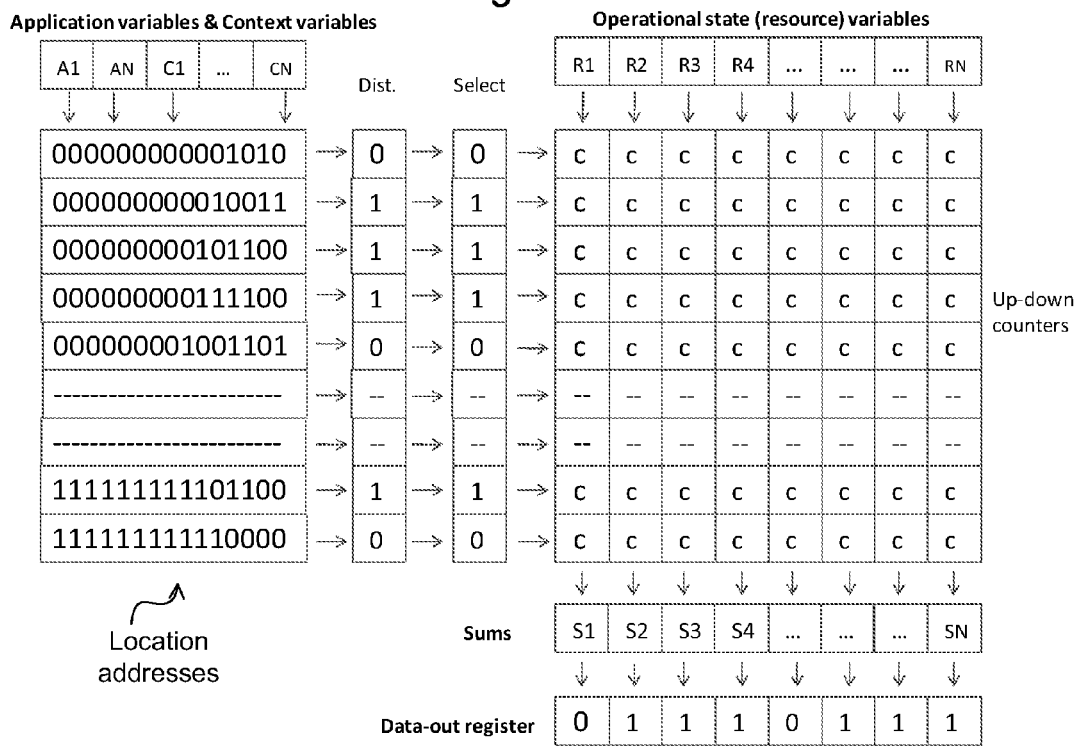

FIGS. 5a and 5b show how operational state patterns may be determined using a memory according to the invention.

An ordinary computer memory is an array of addressable registers or memory locations. The locations are numbered sequentially, and the sequence number is the location's address. A memory with a thousand locations will therefore need ten-bit addresses. If the memory is built for eight-bit words, each location will have eight one-bit storage bins or flip-flops.

A sparse distributed memory may also be implemented as an array of addressable registers or memory locations. The addresses of the locations, however, are not sequence numbers but large bit patterns (e.g. 256-bit addresses). To store 1024-bit data patterns, each location may have 1024 storage bins for small up-down counters. This organization is shown in FIG. 3. Because the memory addresses are large bit patterns, the number of addresses and hence of possible memory locations is very high. Only memories with a small subset of the possible locations may be built in practice, and that is why these memories are called sparse. Practical numbers may range in the thousands to millions to billions of locations.

To move data into and out of the memory array, both kinds of memories may have three special (input/output) registers: one for the memory address or cue, another for the word or data pattern to be written into the memory, and the third for the word or data pattern being read out of the memory.

In addition to the memory array and the input and output registers, FIGS. 3 and 5*a* show intermediate results of a memory operation. The numbers in the column or columns between the address matrix ("location addresses" on the left) and the contents matrix ("operational state vectors or up-down counters on the right) indicate whether a memory location is selected for a given read or write operation. The selection depends on the contents of the address register (the context vector), on the location's address, and on the selection criterion. FIGS. 3 and 5*a* have, in addition, a row of sums as a way of getting from the contents of the memory locations to the final output pattern.

Reading and writing in an ordinary computer memory is simple in concept. Both operations start with specifying a memory address in the address register. That selects one location from the memory array—the location with the matching address. If the memory operation is a write, the word being written is placed in the data-in register, and it will replace the word stored previously in the selected location: if it is a read, the contents of the selected location are copied into the data-out register.

Reading and writing in a sparse distributed memory likewise start with addressing the memory. However, when an address is specified in the memory-address register, the memory array will usually not have a location with that exact address. This is overcome by selecting many locations at once—and by modifying the rules for writing and reading accordingly.

The criterion for selecting or activating a location may be similarity of address patterns: If the location's address is sufficiently similar to the address in the address register, the location is selected. A Hamming distance between address patterns may provide a measure of similarity. The column next to the address matrix in FIG. 5*a* shows these Hamming distances, and the column next to it has ones where this distance does not exceed the agreed maximum distance. These are then the selected (nearby, active) locations, the unselected (distant, inactive) locations being indicated by zeros in the select column. As a rule of thumb, the selection criterion should be such that many locations are active at once, but their number should not exceed a certain portion, e.g. the square root of the total number of memory locations.

A pattern is read out of the memory (from the selected locations) e.g. by computing an average over the contents of the selected locations. A simple average is gotten by adding the contents (vector addition) and by thresholding the sums at zero, with a sum larger than zero yielding a 1 in the output pattern, and a sum smaller than or equal to zero yielding a 0. A bit of the output pattern will then be 1 if, and only if, the patterns written into the currently active locations in the training phase have more ones than zeros in that bit position, constituting a bitwise majority rule.

A property of the sparse distributed memory is sensitivity to similarity, or noise tolerance. It is the result of distributing the data, that is, of writing into and reading from many locations at once, and it may be explained mathematically by the amount of overlap, counted in active memory locations, when the memory is addressed with two different patterns. If two address patterns are very similar to each other, the sets of locations they activate have many locations in common; if they are dissimilar, the common locations are few or none.

The example illustrates that, in a sparse distributed memory, common address bits translate into common memory locations, and common memory locations translate into weights for stored patterns when reading from the memory. Thus, the memory is a means of realizing a weighting function that gives low weights to most of the patterns written into the memory and high weights only to a small number of "relevant" patterns, the relevance being judged by similarity of address.

The operation of the memory may be understood to be statistical, and the actual output may be affected not only by the construction of the memory but also by the structure of the data. The results discussed above may be demonstrated e.g. when the addresses of the locations and the data are a uniform random sample of their respective spaces of bit strings. There may be a further condition that not too many patterns have been written into the memory. The memory may work in the manner described if the number of stored patterns is e.g. less than 1-5 percent of the number of memory locations.

The memory's ability to store associations, and pattern sequences in particular, may give the memory and the data structure a capability to predict, and the failure of a prediction may signal an occasion for learning. Learning may be carried out by training through a set of examples rather than by explicit programming. This is referred to as learning from experience. The term is particularly appropriate if the training patterns encode real-world phenomena.

In FIG. 5*b*, the input address vector is a context vector comprising application variables A1, . . . , AN and context variables C1, . . . , CN. The environment variables may be represented by one or more bits each. The mapping from the environment variable value to the context vector bit pattern may be such that it can be used with the distance measure of the selection criterion in the SDM. The operational state variables R1, . . . , RN may also be formed into a bit string so that these variables may be used in training. The sums S1, . . . , SN may be converted to a bit pattern, where one or more bits indicate the operational state of an operational unit in the system. This information may be used for carrying out energy management in the system e.g. by adapting a clock frequency or switching of some operational units. The sums S1, . . . , SN may also be used directly for energy management, e.g. by setting the clock frequency of an operational unit according to the sum (a large positive value indicates high clock frequency).

The magnitude of the elements S1, . . . , SN may be indicative of the certainty of required operational state of an operational unit (or the necessity of a system resource). Large magnitudes may indicate a high certainty of the operational state of an operational unit, and a small magnitude may indicate a low certainty. For example, only operational state values with a high enough certainty may be used, while those with low certainty may be ignored for the energy management. This may prevent erroneous energy management (e.g. disabling a needed operational unit) even in the case where the context or an application is a completely new one.

The user may choose to train or teach such new situations to the memory. For example, when an output of a low certainty is encountered, and the user indicates that the system should learn a new context, the user may tell the system to detect the utilization of different operational units in the system automatically to form operational state information.

The use of an SDM model as the data structure may allow a highly multidimensional application and context space to be associated with a highly multidimensional resource (operational state) space. Since the computational operations may be implemented to be operable in parallel, this may provide an increase in speed compared to traditional ways of carrying out energy management.

There may be one associative (e.g. SDM) memory structure for operating in all conditions. Alternatively, there may be two, three or more at least partly different memory structures one of which may be selected according to a criterion. For example, there may be one data structure for work use, another for private use employing communication, and a third for private use in a state where power needs to be conserved. There may also be a plurality of data structures that compete with each other and the one that delivers the most reliable result may be used. The reliability may be determined from the values of the selected operational state vectors and/or their sum vector.

Figure 6A:
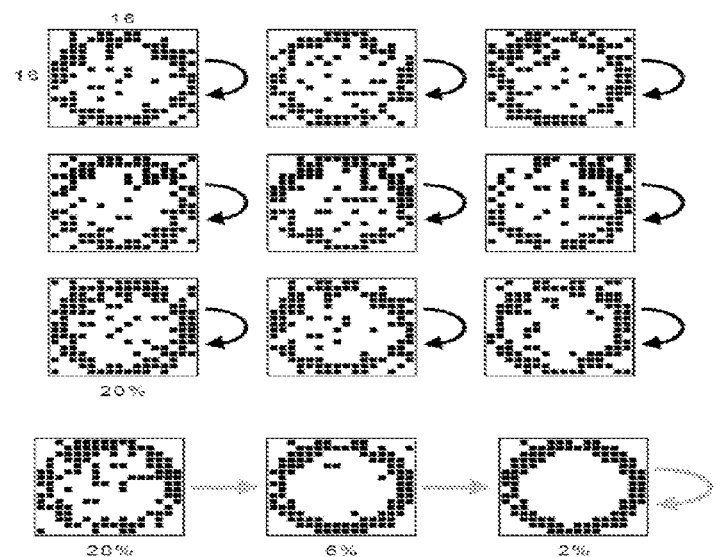
FIGS. 6a, 6b and 6c illustrate iterative reading of a pattern of information from a memory according to an example embodiment.
Figure 6B:
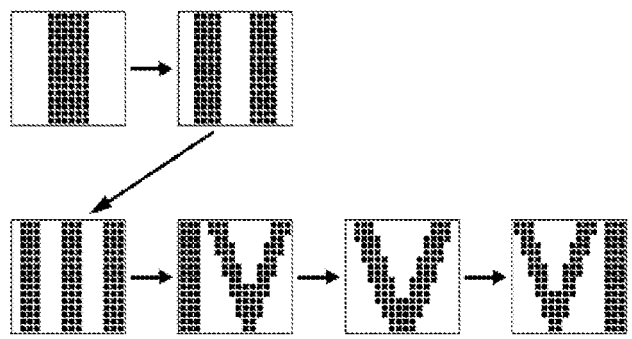
Figure 6C:
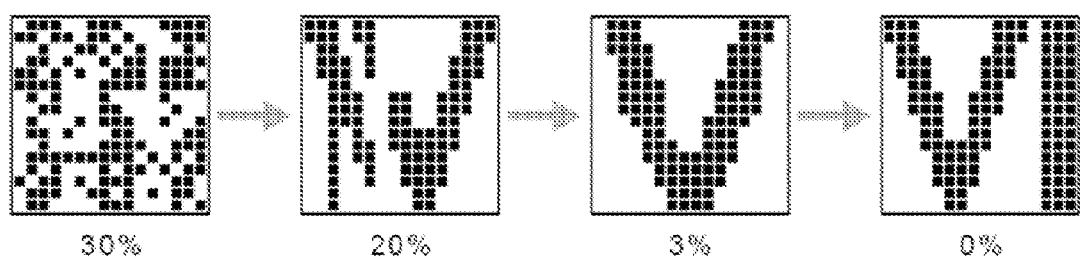

FIGS. 6a, 6b and 6c illustrate iterative reading of a pattern of information from a memory according to an example embodiment.

FIG. 6a illustrates the SDM memory's tolerance for noise in an experiment carried out in an example embodiment. This memory works with 256-bit patterns, and it is autoassociative in type. For ease of comparing patterns with each other, the patterns are displayed on a 16×16 grid with 1-bits shown in black. The nine patterns in the upper part of the figure were obtained by taking a circular pattern and changing 20 percent of the bits at random. Each of the patterns was written into the memory with itself as the address (that is, the address and data lengths of the memory are both 256 bits). The noisy tenth pattern was then used as the address for reading from the memory, and the relatively noise-free eleventh pattern was retrieved. When that pattern was used as the next read address, the final, nearly noise-free pattern was retrieved. Worth special notice is that the noise-free circular pattern was never used as the write address nor was it ever written into the memory (i.e., the memory had never "seen" the ideal pattern; it created it from the noisy versions it had seen).

The method of storage in which each pattern is written into memory with itself as the address, as illustrated in FIG. 6a, is called autoassociative. With autoassociative storage, the memory behaves like a content-addressable memory in the following sense: It allows a stored pattern to be retrieved if enough of its components are known. A more general method of storage in which an address pattern and the associated data pattern are different is called heteroassociative.

FIG. 6b illustrates the use of SDM in storing a sequence of patterns. The sequence is stored as a pointer chain, with the first pattern pointing to the second, the second to the third, and so forth. Any pattern in the sequence can then be used to read out the rest of the sequence simply by following the pointer chain. Furthermore, the cue for retrieving the sequence may be noisy, as shown in FIG. 6c, in which a noisy third pattern retrieves a less noisy fourth, which in turn retrieves an almost noiseless fifth pattern, and the sixth pattern retrieved is perfect. If the memory's address and data patterns are of different size, only heteroassociative storage is possible, although it is not possible to store pattern sequences as pointer chains.

The term 'associative memory' may refer to the general property of linking one pattern to another, or forming an association, the linkage being the association. However, the term may also be understood to be more specific as 'content-addressable memory'. The term "associative memory" may also be understood to imply also noise tolerance (of the input address) as illustrated in the examples above.

Figure 7:
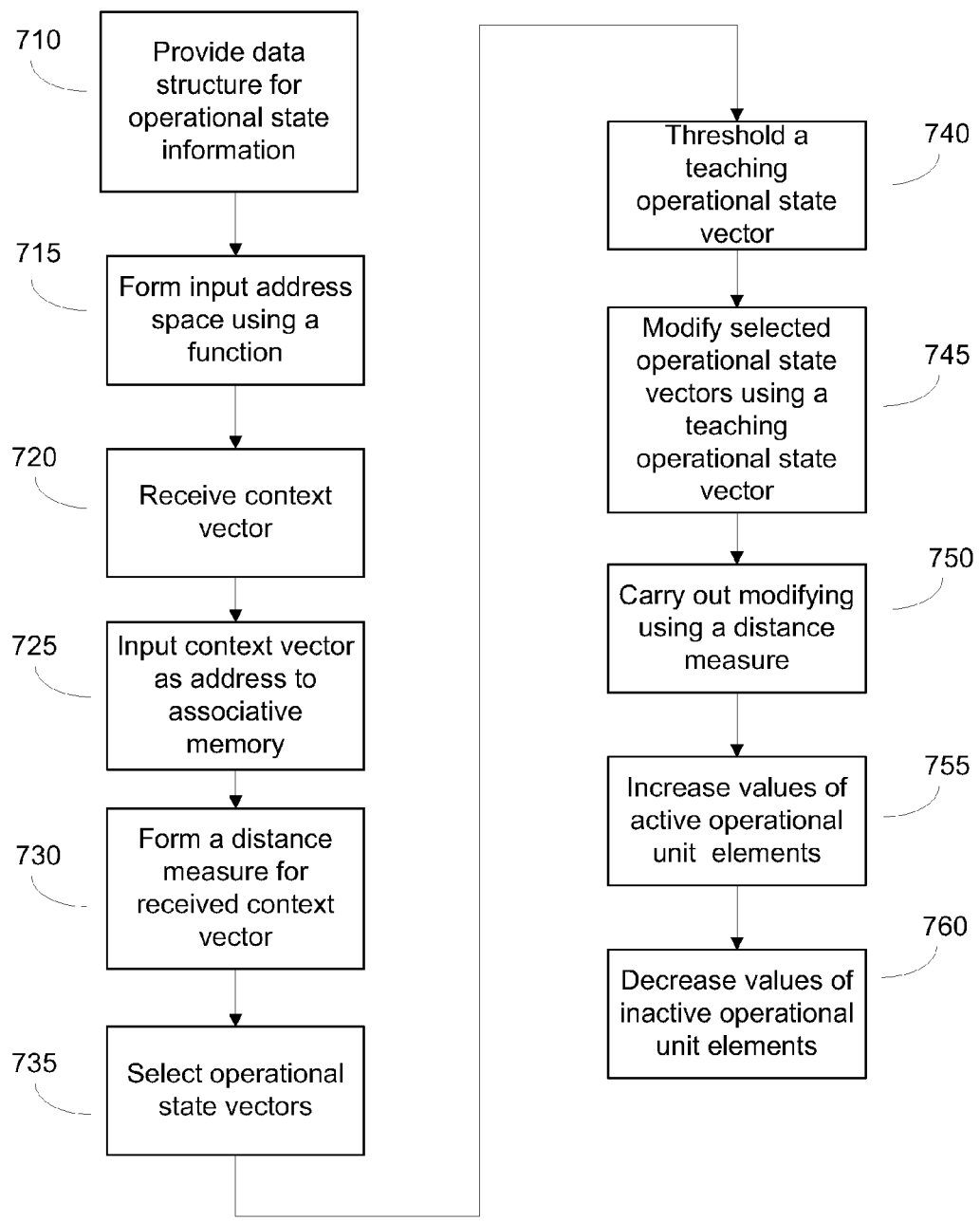
FIG. 7 shows a method for creating a data structure into a memory according to an example embodiment.

FIG. 7 shows a method for creating a data structure into a memory according to an example embodiment. In phase 710, the underlying data structure may be provided e.g. on a computer-readable medium such as a volatile or non-volatile memory, hard disc, USB memory or over the network. The data structure may have addressable locations for storing operational state vectors whose elements correspond to operational units of the system, and possibly addresses corresponding to the operational state vectors. The data structure may be a so-called sparse distributed memory (SDM) or another type of an associative memory. Such a memory may be suitably initialized.

In phase 715, the input address space may be formed. The forming of the input address space may be done completely in random, or there may be a function used in the forming of the input addresses. The function used to assign the locations their addresses may be a random function, that is, at least part of the function may be based on a random number generator. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory.

In phase 720, a context vector is received. The context vector may comprise e.g. bit representations of context variables such as environment variables, information on the state of the system and states of applications on the system. The context vector may be a comparatively long vector, e.g. 500, 1000, 2000 or more bits long. The length of the context vector may depend on the size of the addressable operational state vector memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application or many applications on the system. The context vector may also comprise earlier (history) data of the context, e.g. sampled with the sampling rate of 1 s, 1 minute or 1 hour, and concatenated or otherwise combined with the current context vector.

In phase 725, the received context vector may be input to an associative memory such as a sparse distributed memory as an address. Before input, the context vector may be masked with a mask, or it may be refined by using e.g. an autoassociative sparse distributed memory. In phase 730, a distance measure between the input context vector and the addresses may be formed. This may be carried out in parallel, e.g. so that each memory location carries out its own distance calculation. Alternatively, the comparison may happen wholly or partly sequentially.

In phase 735, the context vector or one or more parts of it may be used to select a plurality of operational state vectors. This may be achieved by comparing the context vector and the addresses of the operational state vectors. The operational state vectors whose corresponding address is sufficiently close to the context vector may then be selected. For example, a Hamming distance between the context vector and the addresses may be used for carrying out the selection. Alternatively, a dot-product based distance measure may be used.

In phase 740, a teaching vector (describing the required operational state of different operational units in the current context and application state) may be processed e.g. by thresholding or by other means. The teaching vector may have been formed e.g. by information received from an external source or measured from the system behavior or performance in the current context or other contexts. The teaching vector may also be processed by an autoassociative sparse distributed memory. The teaching operational state vector may also be comprised in a software application. In this manner, a software application may inform the system of its requirements regarding energy management and availability of system resources. The software application may comprise operational state vectors for a plurality of application states and/or contexts.

In phase 745, the selected operational state vectors may be modified in order to train the data structure to output a matching operational state vector when a context vector is presented to the data structure. The training may happen e.g. so that a training or teaching operational state vector is used, and the operational state vectors in the data structure are modified as indicated by the training vector. In phase 750, the modification may be boosted or the modification may happen already in phase 745 so that the distance (of the address) is used as a basis for modifying the vectors: the smaller the distance, the larger the modification.

In phase 755, or already in earlier phases 745 and 750, the elements of the operational state vectors that correspond to those elements in the training vector indicating the active operational units may be incremented. Similarly, in phase 760, or already in earlier phases 745 and 750, the elements of the operational state vectors that correspond to those elements in the training vector indicating the inactive operational units may be decremented.

The modification of the operational state vectors in the data structure may be carried out during use, that is, the data structure may be updated e.g. when the system detects that the output operational state data may not be reliable. As described, this may be detected from the values of the sum vector being close to zero. In such a case, the system may also measure information on operational states of operational units to determine the input teaching vector.

Figure 8:
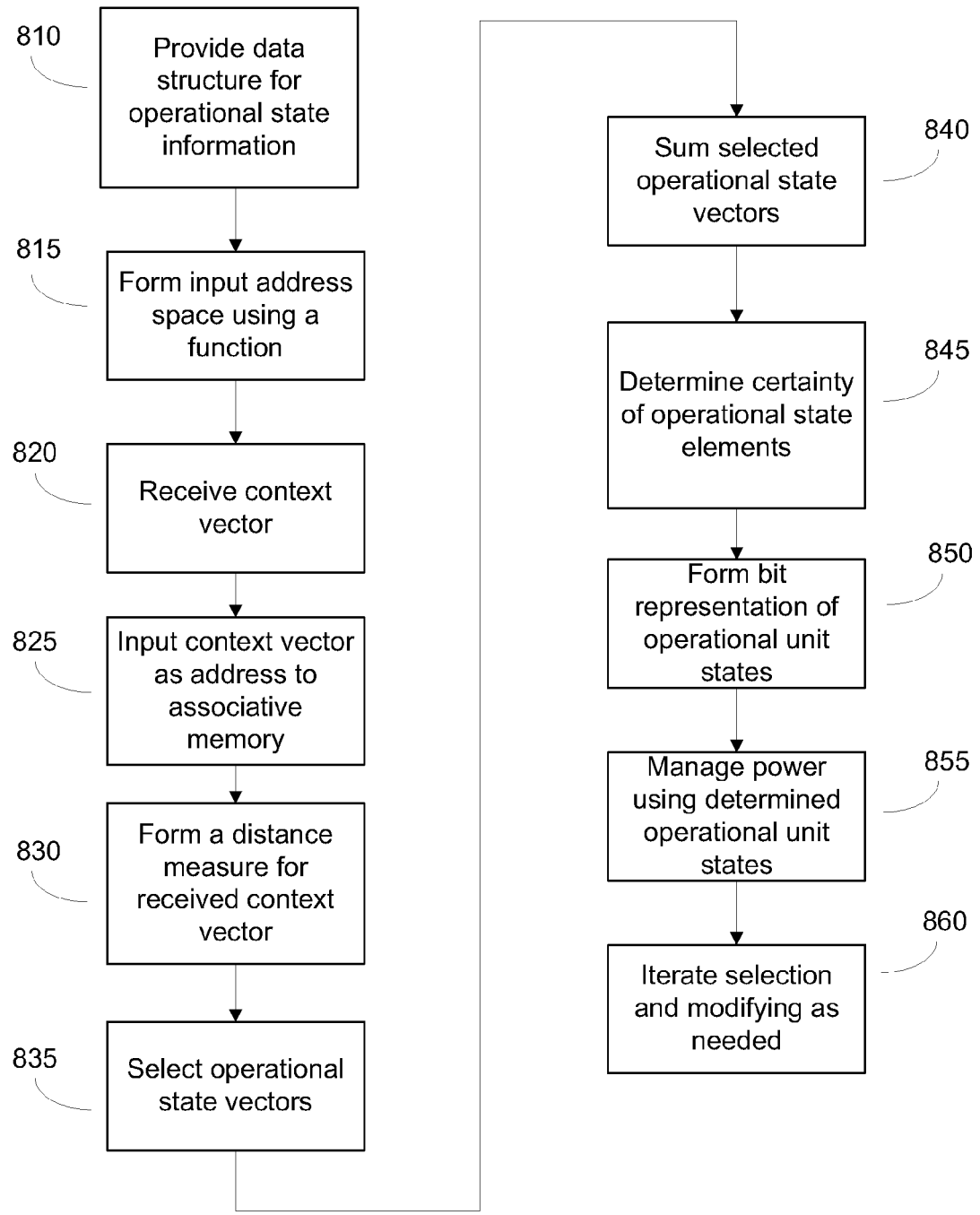
FIG. 8 shows a method for determining operational state using a context vector according to an example embodiment.

FIG. 8 shows a method for determining operational state of operational units of a system using a context vector according to an example embodiment. In phase 810, the underlying data structure may be provided e.g. on a computer-readable medium such as a volatile or non-volatile memory, hard disc, USB memory or over the network. The data structure may have addressable locations for storing operational state vectors, and possibly addresses corresponding to the operational state vectors. The data structure may be a so-called sparse distributed memory (SDM) or another type of an associative memory. Such a memory may be suitably initialized, e.g. by loading data onto it that is suitable for carrying out energy management as described earlier.

In phase 815, the input address space may be formed, possibly together and synchronized with phase 810. That is, addresses for the memory locations may be loaded or determined. The forming of the input address space may be done completely in random, or there may be a function used in the forming of the input addresses. The function used to assign the locations their addresses may be a random function, that is, at least part of the function may be based on a random number generator. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory. The assignment may also be completely deterministic e.g. based on a pseudo-random function that produces the same addresses over and over again when applied to a memory address space of the same characteristics. This may avoid the need of storing the memory addresses, since they may be generated upon loading the data into the memory.

In phase 820, a context vector is received. The context vector may comprise e.g. bit representations of context variables such as environment variables, information on the state of the system and states of applications on the system. The context vector may be a comparatively long vector, e.g. 500, 1000, 2000 or more bits long. The length of the context vector may depend on the size of the addressable operational state vector memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application or many applications on the system. The context vector may also comprise earlier (history) data of the context, e.g. sampled with the sampling rate of 1 s, 1 minute or 1 hour, and concatenated or otherwise combined with the current context vector.

In phase 825, the received context vector may be input to an associative memory such as a sparse distributed memory as an address. Before input, the context vector may be masked with a mask, or it may be refined by using e.g. an autoassociative sparse distributed memory. In phase 830, a distance measure between the input context vector and the addresses may be formed. This may be carried out in parallel, e.g. so that each memory location carries out its own distance calculation. Alternatively, the comparison may happen wholly or partly sequentially.

In phase 835, the context vector or one or more parts of it may be used to select a plurality of operational state vectors. This may be achieved by comparing the context vector and the addresses of the operational state vectors. The operational state vectors whose corresponding address is sufficiently close to the context vector may then be selected. For example, a Hamming distance between the context vector and the addresses may be used for carrying out the selection. Alternatively, a dot-product based distance measure may be used.

In phase 840, the sum or other combination (e.g. a sum weighted by the distances from the input context vector, or an average) of the selected operational state vectors may be formed. A positive element of a operational state vector may be indicative of a required operational unit, and a negative element may be indicative of an operational unit that is not required. An element of zero or close to zero may indicate that the need of an operational unit is not known. The information on the magnitude of the operational state vector elements may thus be used in phase 845 to form certainty information on the need of the corresponding operational units in the context.

In phase 850, a representation from the combination of the vectors may be formed, e.g. as a bit representation or as quantified representation. Positive numbers may be converted to a bit having a value "1" and zero or negative value to a bit having a value of "0". Alternatively, a range of values, e.g. a range of −1024 to 1023 may be quantified to a two-bit representation having the values of "00", "01", "10" and "11", describing the degree of need or required operational state of an operational unit. Some of the operational state information may also be masked out, e.g. based on the certainty information.

In phase 855, the selected operational state vectors may be used together in energy management, or merely to provide information for energy management (e.g. to a remote location such as a web service). The vectors may be used together e.g. by summing them, as described above. The operational state information of the individual operational units of the system may be used for energy management either individually or together with each other as input to the energy management process.

The selection and energy management may be iterated as needed in phase 860.

An environment variable may be understood to be anything that can be measured or logged in an environment. Examples of environment variables are the level of illumination, or the level and spectrum of background noises. The environment variables define an n-dimensional environment space, where n is the number of variables. The number of variables can be very high. It may be understood that the context space may comprise the environment space, variables that describe the state of the system and the state of applications on the system.

A single environment or context can be presented as a single point or as a cloud of points, depending on how much variation there is within environment variables in the environment, in the environment space. Contexts have been defined as clusters in the space of context variables. During later use, the device may measure a set of context variables, and compare those to values related to different clusters. Context variables typically describe similar characteristics as the environment variables described above, but may also cover other characteristics such as the internal state of the device, or existing infrastructure for device connectivity.

Context may be understood to be an information space consisting of situations, entities and their roles and relations. Entities are formed by grouping a set of observations. Observations, on the other hand, are generated by a collection of sensors, each populating their respective observable variables. An example of an environment or context space may be presented in light of the following aspects: working environment (home, office, laboratory), working space, temperature, time, location, altitude, acceleration, attitude, lighting, noise conditions, humidity, power sources, functions e.g. backlight control, font size adjustment and zoom, I/O channels e.g. touch screen, voice command, gesture recognition, audio output and vibration.

The context may also be indicative of an operating profile, user profile, user preferences, availability of a keyboard, use of keyboard, availability of a touch input apparatus, memory usage and availability, processor status information, network information, mass storage access information energy source information and power supply conditions.

The context may also comprise the state of software applications such as registered applications, running applications, application types, data types used by applications, application activity information, information on number of threads applications are using, and processor and memory load information of applications.

The embodiments may provide several advantages over known methods. For example, the processing of the context information may be faster, since address comparison, selection and summing may be implemented as very efficient operations.

Figure 9:
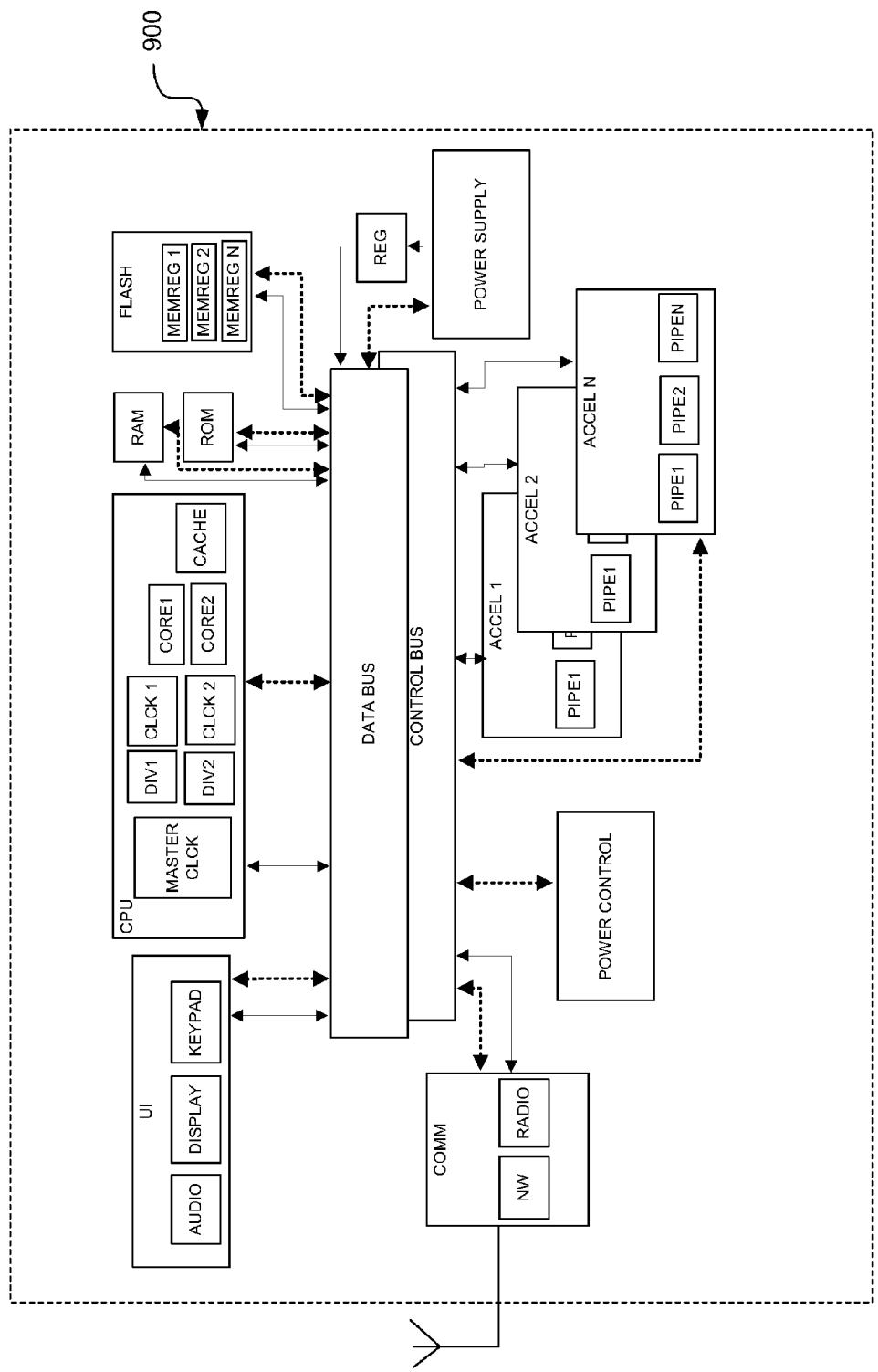
FIG. 9 shows an example of applying energy management in a system according to an example embodiment.

FIG. 9 shows an example of applying energy management in a system according to an example embodiment.

For a system designer, a known system that merely recognizes a context still may not provide enough information for efficient energy management. Even though the system may know the context there still remains the need to analyze the context to find out the operational requirements in the context. A system described in the example embodiments may provide the advantage of removing the step of recognizing a context, and create a straightforward system for coming up with the operational requirements directly. Further advantage of the system may be that it may be unsupervised.

The associative memory techniques may allow to connect the environment variables to operational state variables in a seamless way. The creation of associations is made in simple computation model without complex optimization algorithms. Very high dimensional associations (many-to-many mapping associations) may be implemented in a compact way. For example, some neural networks and Hidden Markov model implementations may be more complex ways to solve this association problem, since they may be targeted to many-to-one mapping. An advantage of the many-to-many mapping capability may be that cross-dependencies between context variables and user resource availabilities may be modeled more reliably.

In practice, the energy management in a system may be carried out as follows.

In FIG. 9, different operational units of a system 900 are shown. The operational units may be located in a single apparatus, or the system may be distributed across multiple apparatuses. The system 900 may thus be a system comprising several interconnected devices like shown in FIG. 2a, or a single device or apparatus.

The system may comprise one or more power sources POWER SUPPLY and voltage regulators REG for providing power to the operational units. The system may comprise an energy management unit POWER CONTROL for managing the operational status of the different operational units. The energy management unit may comprise the functionality for determining the required operational status of the different units as described earlier in this application, or the energy management unit may receive this information elsewhere, e.g. from the processor CPU. That is, the energy management unit may determine the status in which the operational units of the system are to be put in the current context. In addition to hardware units, as described below, the energy management unit POWER CONTROL may also control the operation of software applications running on the system, or operating system services running on the system. This may happen e.g. by increasing or decreasing the priority of the application's processes, and/or by enabling or disabling an application or an operating system service wholly or partially.

The system may comprise a processor CPU, the processor comprising or being operatively connected to at least one clock MASTER CLCK, CLCK1, CLCK2 having optional clock dividers DIV1, DIV2 for lowering the clock speed. The processor CPU may comprise one, two, three, four, eight or more sub-units or processor cores CORE1, CORE2. The processor cores may be connected to the clocks. The processor may also comprise cache memory CACHE for storing instructions and data before they are sent to the processor cores. The processor may be connected to one or more buses DATA BUS, CONTROL BUS for transferring data and instructions to and from the processor. Data transfer is indicated with a solid arrow and energy management control is indicated with a dotted line. The energy management control signal may be originating from the energy management unit POWER CONTROL.

The system may comprise various mass storage and memory units RAM, ROM, FLASH, and the memory units may comprise sub-units MEMREG1, MEMREG2, MEMREGN. When the memory units or sub-units are not needed, they may be switched off or put into a low-power mode through an energy management command.

The system may comprise one or more hardware acceleration units ACCEL1, ACCEL2, ACCELN for providing faster processing for special data like video data or graphics rendering. The acceleration units may comprise sub-units like a number of processing pipelines PIPE1, PIPE2, PIPEN. The acceleration units and sub-units may be switched on and off based on the needs of the software applications active on the system. The switching may take place by an energy management command from the energy management unit POWER CONTROL.

The system may also comprise various communication units COMM such as a network communication unit NW and a radio communication unit RADIO. The system may also comprise user interface units UI such as an audio unit AUDIO, a display unit DISPLAY and a keypad unit KEYPAD. The communication and user interface units may be switched on and off based on the communication needs of the system. The switching may take place by an energy management command from the energy management unit POWER CONTROL.

The system may operate so that it first receives or forms a context vector based on environmental, system status and application status information. This forming may happen e.g. in the energy management unit POWER CONTROL, or elsewhere, and the forming may happen as described earlier in this application. The context vector may then be used, as described earlier, to select a plurality of operational state vectors, the elements of the plurality of operational state vectors being indicative of operational states of the various operational units and sub-units of the system (CPU, RAM, ROM, FLASH, ACCEL, COMM, UI, PIPE, CLCK etc.). The selected operational state vectors may then be used together in power management of the various operational units of the system.

It is obvious that each of the described behaviors are just examples of how the system may behave. They may be decided by the system designer after considering what kind of energy management would suit to contexts with different applications, or they may be chosen by the actual user of the device.

Wireless mobile devices or computer can offer different applications from internet browsing to video playback and record to high-quality audio playback. In addition, mobile devices or computers are offering applications requiring multiple antennas, such as FM radio, GPS positioning, Bluetooth connectivity and WLAN networking.

It has been noticed here that designing a static platform that can successfully incorporate all of these applications as well as the next generation of applications (possibly unknown at this stage), such as high-definition video, high-fidelity audio and high-quality digital imaging is a challenge.

An example use case of the device may be as follows. The user of the device is in the middle of watching a movie, by streaming the movie from an internet service over a WLAN network when a phone call is received. The system may then operate to automatically switch to the call using a Bluetooth headset and pausing the movie, as well as disabling the video decoder, WLAN and related units. When the call is finished, the system may disconnect the Bluetooth connection, enable the video decoder and WLAN and switch back to the movie application and resume playing from where the user left off.

Designing for these complex use cases requires breaking the use cases down into the requirements on system components as in FIG. 9, such as Bluetooth, video encoder/decoder, image processing, audio, etc. Each component may then be optimized for energy management, as well as the interaction between components and the whole system. The embodiments of the present application may provide a way to carry out the design in a more efficient and simple way than earlier.

The energy management system according to the various embodiments may optimize the system for bandwidth. The system needs to have enough memory, bus capacity and processing bandwidth to handle the amount of information coming in and going out of the system without experiencing system hangs. For example, The next generation of mobile devices may be expected to deliver full 1080p high-definition (HD) video playback at 30 frames per second (fps) with high-fidelity audio in-sync with the video. Without enough bandwidth, not only may the audio be out of sync with the video, but the handset may also not be able to deliver the full 30 fps and the human eye can detect the choppiness of the video. Additionally, if the system does not have enough bandwidth, applications such as Internet browsing may not deliver the experience users expect. By carrying out energy management of the various units and sub-units of the system according to the various embodiments of the present application, these challenges may be overcome.

The energy management system according to the various embodiments may optimize the system for latency. Users may expect to have applications open instantly and to be able to move between applications with little delay. By carrying out energy management of the various units and sub-units of the system according to the various embodiments of the present application, these challenges may be overcome.

The energy management system according to the various embodiments may optimize the system for seamless transitions between applications—in other words, having multiple applications in the same handset all sharing resources without interfering or interrupting each other. It may be a challenge to design applications with maximum performance while maintaining coexistence. For example, using the handset's built in camera, a user may expect to be able to take a picture and to be able to take the next picture quickly, without having to wait for the device to catch-up. The challenge is having multiple applications running at the same time and sharing resources without impacting responsiveness or in the worst case shutting down the system. By carrying out energy management of the various units and sub-units of the system according to the various embodiments of the present application, these challenges may be overcome.

The energy management system according to the various embodiments may optimize the system for battery life. Designing within the confines of today's available battery power while providing the performance needed for today's top applications may be a challenge. To find the optimal balance between power consumption and performance, a platform has to be designed with a holistic power management approach, one that looks at the entire system and not just on a chip-by-chip basis. In order to meet these use-case challenges, the handset must be architected at the system level, not just at the chip level. By carrying out energy management of the various units and sub-units of the system according to the various embodiments of the present application, these challenges may be overcome.

In order to design successful handsets in the future, architects must take into account very complex use cases. This may require breaking down each use case into system-level components and optimizing each component as well as the overall system.

In the present system, an associative memory or the like is introduced. The present energy management system may be able to learn the user's behavior in different contexts and for different applications and map these to the required availability of system resources. The mapping may help to solve at least partly the four aspects, as described above: bandwidth, latency, seamless transitions between applications and battery life since the associative memory model may take into account different context parameters simultaneously. The output vector may then be used to control the platform's units and sub-units, as described earlier.

The system can optimize and predict user's application needs and therefore it may stop or put into halt state the many of application and hardware subunits. In this way there may be more bandwidth in the system and the general latency times may be more suitable for the user, since unnecessary units are not taking up energy and resources.

Figure 10:
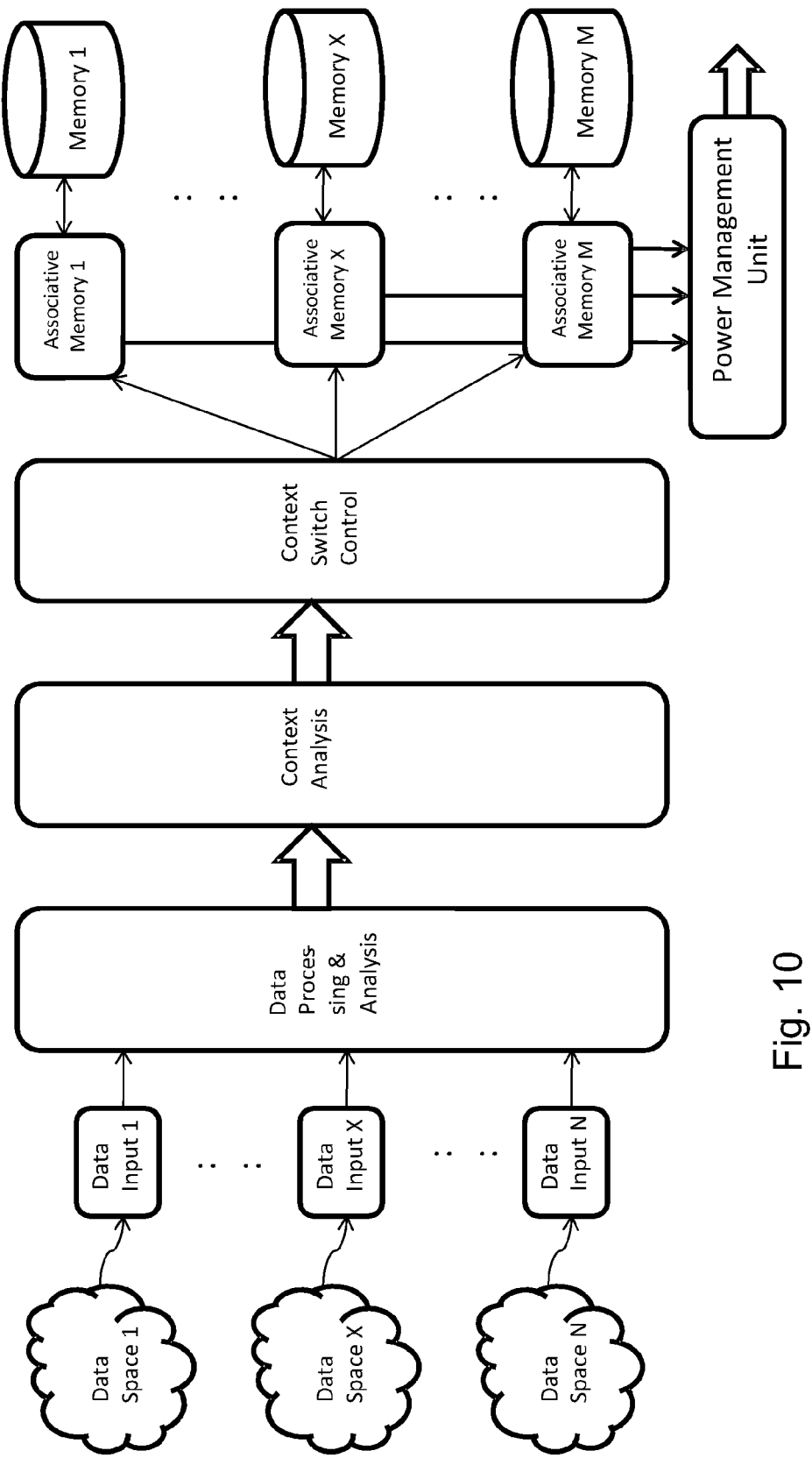
FIG. 10 illustrates an embodiment with a plurality of mappings between context vectors and operational state vectors.

FIG. 10 illustrates an embodiment with a plurality of mappings between context vectors and operational state vectors. Different situations, environments, applications and such have different data spaces (Data Space 1, . . . , Data Space X, . . . Data Space N) of data vectors indicative of the context. These different data spaces produce data inputs 1, . . . , X, . . . , N for the system, descriptive of the current context. After processing this data, the context may be determined. A context may be understood here to mean a status of the environment, the status of applications on the system, the status of the system itself etc. as explained earlier. For example, the context may be "image processing", "talking on the phone", "office", "at home", "car game", "low battery" etc. Based on the recognized or determined context, a corresponding or best matching associative memory may be chosen among a group of associative memories (Associative Memory 1, . . . , Associative Memory X, . . . , Associative Memory M). The associative memories, or the data structure residing therein, may have been formed e.g. by the methods described earlier in this application by training the associative memory in a specific context. The associative memories may also have been formed by processing a single associative memory. There may be related data storages 1, . . . X, . . . , M for the associative memories so that data may be loaded into and out from the associative memories. The output from a single (selected) associative memory may then be used in the energy/power management unit for adapting the operational state of different operational units in the system. Alternatively, a plurality of associative memories may be chosen, and a plurality of output vectors from the associative memories may be used for adapting the operational states. For example, the associative memories may be used in a competitive way by selecting the output from the associative memory based on the reliability of the output. The reliability may be determined as described earlier, that is, based on the sum vector values (S1, . . . , SN in FIG. 5b) or by some other means. The sum vector values may also be used directly to set the operational states of different operational units, e.g. to set the clock speeds of the operational units according to the sum vector element values.

The various embodiments of the invention can be implemented with the help of computer program code (e.g. microcode) that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method comprising:
providing, by an apparatus, a data structure comprising context vectors and operational state vectors of a plurality of operational units in a system, the data structure having an association between said context vectors and said operational state vectors, and the operational units including hardware, software applications, or a combination thereof;
receiving, by the apparatus, a context vector of the system;
using, by the apparatus, said context vector and a distance measure to select a plurality of operational state vectors, the plurality of operational state vectors being indicative of operational states and respective power consumption states of the operational units, and the respective power consumption states including one or more power-performance ratios and one or more transition costs; and
modifying, by the apparatus, the selected operational state vectors using a teaching operational state vector associated with said context vector by increasing a value of an element corresponding to the active operational unit in the teaching operational state vector according to said distance measure.

2. A method according to claim 1, wherein said selected operational state vectors are further modified by decreasing a value of an element corresponding to an inactive operational unit in said teaching operational state vector, and
wherein the operational units include a plurality of user devices.

3. A method according to claim 1,
wherein the system is a user device, and the hardware includes one or more processors, one or more memory units, one or more acceleration units, one or more communication units, or a combination thereof.

4. A method according to claim 1, further comprising thresholding said teaching operational state vector; and
modifying said selected operational state vectors using said thresholded teaching operational state vector,
wherein context vector is indicative of environmental variables including one or more temperatures, one or more time points, one or more locations, one or more altitudes, one or more acceleration speeds, one or more lighting conditions, one or more noise conditions, one or more humidity conditions, or a combination thereof.

5. A method according to claim 1, further comprising:
forming said context vector by combining data from at least two time instances.

6. A method comprising:
receiving, by an apparatus, a context vector;
inputting, by the apparatus, said context vector as a single memory address input to an associative memory;

selecting, by the apparatus, a plurality of operational state vectors stored in the associative memory using an address distance between said inputted context vector, the plurality of operational state vectors being indicative of one or more power-performance ratios and one or more transition costs of a plurality of operational units of a system;

modifying, by the apparatus, the selected operational state vectors using a teaching operational state vector associated with said context vector by increasing a value of an element corresponding to the active operational unit in the teaching operational state vector according to said distance measure; and managing, by the apparatus, power consumption of the operational units with said modified operational state vectors.

7. A method according to claim 6, wherein said associative memory is a sparse distributed memory, the method further comprising masking the context vector with a mask before inputting said context vector into said associative memory at an input address, wherein a plurality of data vectors of the operational state vectors are selected from the associative memory when the distance meets a threshold value.

8. A method according to claim 7, further comprising choosing said associative memory among a group of associative memories based on said received context vector, before inputting said context vector into said associative memory, wherein the address distance is a Hamming distance or a dot-product based distance.

9. A method according to claim 7, wherein a possible address space of context addresses comprises more entries than a total number of context addresses of the operational state vectors, and the addresses are assigned to the operational state vectors using a function.

10. A method according to claim 9, wherein the function is a random function.

11. A method according to claim 9, wherein the function corresponds to a statistical distribution of context vectors.

12. A method according to claim 6, further comprising:

adapting operational states of the operational units in the system based on the modified operational state vectors, wherein the adapted operational states change the power consumption.

13. An apparatus comprising:

at least one processor, and at least one memory including computer program code for one or more programs, the at least one memory and said computer program code configured to, with the at least one processor, cause the apparatus to perform at least the following:

receive a context vector;

input said context vector as a single memory address input to an associative memory;

select a plurality of operational state vectors stored in the associative memory using an address distance between said inputted context vector and the operational state vectors, the plurality of operational state vectors being indicative of one or more power-performance ratios and one or more transition costs of a plurality of operational units of a system;

modify the selected operational state vectors using a teaching operational state vector associated with said context vector by increasing a value of an element corresponding to the active operational unit in the teaching operational state vector according to said distance measure; and manage power consumption of the operational units with said modified operational state vectors.

14. An apparatus according to claim 13, wherein the associative memory is a sparse distributed memory, and the apparatus is further caused to:

mask said context vector with a mask before inputting said context vector into said associative memory at an input address;

wherein a plurality of data vectors of the operational state vectors are selected from the associative memory when the distance measure meets a threshold value.

15. An apparatus according to claim 13, further comprising a processor for producing said context vector.

16. An apparatus according to claim 13 further comprising different sub-units of said operational units, and a processor for enabling and disabling or setting operational states of said sub-units for managing the power consumption.

17. A non-transitory computer readable storage medium carrying one or more sequences of one or more instructions which, when executed by one or more processors, cause an apparatus to at least perform the following steps:

providing a data structure comprising context vectors and operational state vectors of a plurality of operational units in a system, the data structure having an association between said context vectors and said operational state vectors, and the operational units including hardware, software applications, or a combination thereof;

receiving a context vector of the system;

using said context vector and a distance measure to select a plurality of operational state vectors, the plurality of operational state vectors being indicative of operational states and respective power consumption states of the operational units, and the respective power consumption states including one or more power-performance ratios and one or more transition costs; and modifying the selected operational state vectors using a teaching operational state vector associated with said context vector by increasing a value of an element corresponding to the active operational unit in the teaching operational state vector according to said distance measure.

* * * * *